United States Patent
Abumiya et al.

(10) Patent No.: US 8,092,765 B2
(45) Date of Patent: Jan. 10, 2012

(54) METHOD OF PROCESSING NON-FERROUS SMELTING INTERMEDIATES CONTAINING ARSENIC

(75) Inventors: Mitsuo Abumiya, Tokyo (JP); Yusuke Sato, Akira (JP); Hironobu Mikami, Akita (JP); Masami Oouchi, Tokyo (JP); Tetsuo Fujita, Tokyo (JP); Masayoshi Matsumoto, Tokyo (JP)

(73) Assignee: Dowa Metals and Mining Co., Ltd., Tokyo (JP)

( * ) Notice: Subject to any disclaimer, the term of this patent is extended or adjusted under 35 U.S.C. 154(b) by 0 days.

(21) Appl. No.: 12/452,686

(22) PCT Filed: Jul. 11, 2008

(86) PCT No.: PCT/JP2008/062617
§ 371 (c)(1),
(2), (4) Date: Apr. 15, 2010

(87) PCT Pub. No.: WO2009/019955
PCT Pub. Date: Feb. 12, 2009

(65) Prior Publication Data
US 2010/0196231 A1    Aug. 5, 2010

(30) Foreign Application Priority Data

Aug. 9, 2007 (JP) ................. 2007-208432
Mar. 10, 2008 (JP) ................. 2008-059366

(51) Int. Cl.
*C01G 28/00* (2006.01)
(52) U.S. Cl. ...................... 423/87; 423/594.1
(58) Field of Classification Search .............. 423/87, 423/594.1
See application file for complete search history.

(56) References Cited

U.S. PATENT DOCUMENTS

| | | | |
|---|---|---|---|
| 4,244,927 A | 1/1981 | Reynolds et al. | |
| 4,572,822 A | 2/1986 | Abe et al. | |
| 5,126,116 A | 6/1992 | Krause et al. | |
| 5,135,223 A | 8/1992 | You | |
| 5,449,503 A | 9/1995 | Redmon et al. | |
| 2003/0192404 A1* | 10/2003 | Jones | 75/744 |

FOREIGN PATENT DOCUMENTS

| | | |
|---|---|---|
| JP | A-58-24378 | 2/1983 |
| JP | A-58-141346 | 8/1983 |
| JP | B2-61-24329 | 6/1986 |
| JP | A-62-182252 | 8/1987 |
| JP | A-4-238816 | 8/1992 |

(Continued)

OTHER PUBLICATIONS

Weert et al., "Aqueous Processing of Arsenic Trioxide to Crystalline Scorodite," *JOM*, Jun. 1994, pp. 36-38, vol. 46, No. 6. Published by Springer New York LLC, USA.

(Continued)

*Primary Examiner* — Steven Bos
(74) *Attorney, Agent, or Firm* — Oliff & Berridge PLC

(57) ABSTRACT

To extract arsenic from intermediates containing arsenic, to outside the system in stable form. A method of processing non-ferrous smelting intermediate containing arsenic in sulfide form and a non-ferrous smelting intermediate containing arsenic and copper as metal; a solution adjusting step of adding an oxidation agent to the leaching solution to oxidize trivalent arsenic to pentavalent arsenic and obtain an adjusting solution; and a crystallization step of converting arsenic in the adjusted solution to scorodite crystals.

9 Claims, 4 Drawing Sheets

FOREIGN PATENT DOCUMENTS

| | | |
|---|---|---|
| JP | A-6-25763 | 2/1994 |
| JP | A-9-110428 | 4/1997 |
| JP | A-9-241776 | 9/1997 |
| JP | A-9-315819 | 12/1997 |
| JP | A-11-47764 | 2/1999 |
| JP | A-2000-219920 | 8/2000 |
| JP | A-2003-137552 | 5/2003 |
| JP | A-2004-307965 | 11/2004 |
| JP | A-2005-161123 | 6/2005 |
| JP | A-2006-116468 | 5/2006 |
| JP | A-2006-198448 | 8/2006 |
| JP | A-2006-328498 | 12/2006 |

OTHER PUBLICATIONS

Droppert et al., "Ambient Pressure Production of Crystalline Scorodite From Arsenic-Rich Metallurgical Effluent Solutions," *EPD Congress*, Feb. 4, 1996, pp. 227-239, published by The Minerals, Metals &Materials Society, Warrendale, Pa, USA.

Extended European Search Report issued in European Application No. 08791096.4 on Jul. 22, 2010.

Extended European Search Report issued in European Application No. 08791100.4 on Aug. 27, 2010.

Extended European Search Report issued in European Application No. 08791098.0 on Jul. 27, 2010.

Extended European Search Report issued in European Application No. 08791092.3 on Jun. 28, 2010.

Nishimura et al., "On the solubility products of Ferric, Calcium and Magnesium Arsenates," Bulletin of the Research Institute Of Mineral Dressing and Metallurgy, Jun. 1978, pp. 19-26, vol. 34, No. 1, Tohoku University, Sendai, Japan.

Krause et al., "Solubilities and stabilities of Ferric Arsenate compounds," Hydrometallurgy, 1989, pp. 311-337, vol. 22 Elsevier Science Publishers B.V., Amsterdam.

Filippou et al., "Arsenic immobilization by controlled Scorodite precipitation," JOM, Dec. 1997, pp. 52-55.

International Search Report issued in International Application No. PCT/JP2008/062617 issued on Oct. 21, 2008.

International Search Report issued in International Application No. PCT/JP2008/062610 on Oct. 14, 2008 (with English-language translation).

International Search Report issued in International Application No. PCT/JP2008/062611 on Oct. 14, 2008 (with English-language translation).

International Search Report issued in International Application No. PCT/JP2008/062615 on Aug. 19, 2008 (with English-language translation).

International Search Report issued in International Application No. PCT/JP2008/062619 on Aug. 19, 2009 (with English-language translation).

Written Opinion of the International Searching Authority issued on Feb. 9, 2010 in corresponding International Application No. PCT/JP2008/062610.

Written Opinion of the International Searching Authority issued on Feb. 9, 2010 in corresponding International Application No. PCT/JP2008/062611.

Written Opinion of the International Searching Authority issued on Feb. 9, 2010 in corresponding International Application No. PCT/JP2008/062615.

Written Opinion of the International Searching Authority issued on Feb. 24, 2010 in corresponding International Application No. PCT/JP2008/062617.

Written Opinion of the International Searching Authority issued on Feb. 9, 2010 in corresponding International Application No. PCT/JP2008/062619.

U.S. Appl. No. 12/452,509, filed on Mar. 18, 2010 in the name of Mitsuo Abumiya et al.

U.S. Appl. No. 12/452,534, filed on Mar. 24, 2010 in the name of Mitsuo Abumiya et al.

U.S. Appl. No. 12/452,593, filed on Jan. 11, 2010 in the name of Mitsuo Abumiya et al.

U.S. Appl. No. 12/452,586, filed on Mar. 29, 2010 in the name of Mitsuo Abumiya et al.

U.S. Appl. No. 12/452,686, filed on Apr. 15, 2010 in the name of Mitsuo Abumiya.

May 27, 2011 Office Action issued in U.S. Appl. No. 12/452,509.

May 26, 2011 Office Action issued in U.S. Appl. No. 12/452,586.

May 31, 2011 Office Action issued in U.S. Appl. No. 12/452,593.

Mar. 7, 2011 Office Action issued in U.S. Appl. No. 12/452,534.

Supplementary European Search Report issued in Application No. 08 79 1091; Dated Oct. 12, 2010.

Sep. 9, 2011 Notice of Allowance issued in U.S. Appl. No. 12/452,534.

Sep. 20, 2011 Notice of Allowance issued in U.S. Appl. No. 12/452,593.

Sep. 19, 2011 Office Action issued in U.S. Appl. No. 12/452,586.

* cited by examiner

METHOD OF PROCESSING NON-FERROUS SMELTING INTERMEDIATES CONTAINING ARSENIC

TECHNICAL FIELD

The present invention relates to a non-ferrous smelting intermediate processing method of extracting arsenic from non-ferrous smelting intermediates that contain arsenic, and converting the arsenic to a stable arsenic compound.

BACKGROUND ART

The following documents concerning the stability of compounds which contain arsenic are available. Patent document 1 presents a method of producing scorodite from arsenic contained in smelting smoke and ash.

Patent document 2 presents a method of leaching arsenic sulfide where air is blown into a slurry containing arsenic sulfide while adding an alkali, in order to leach out arsenic while maintaining the pH between 5 and 8.

Patent documents 3 and 4 relate to techniques of dissolving arsenic sulfide in an acidic region, and describe a method of producing diarsenic trioxide ($As_2O_3$) from an arsenic sulfide residue and further dissolution of arsenic sulfide in an acidic region.

Non-patent document 1 reports on the solubility product of iron arsenate, calcium arsenate, and magnesium arsenate. According to this document, calcium arsenate and magnesium arsenate are stable only in the alkali region, but iron arsenate is stable from the neutral to acidic region, and the minimal solubility at a pH of 3.2 was reported to be 20 mg/l.

Non-patent document 2 discloses the solubility of iron arsenate and scorodite. This document shows that the solubility of arsenic from scorodite in the weakly acidic region is two orders of magnitude smaller than that of noncrystalline iron arsenate, and discloses that scorodite is a stable arsenic compound.

Non-patent document 3 presents a method of producing scorodite from arsenic contained in sulfuric acid plant waste water and smelter waste water.

Patent document 1: Japanese Patent Application Laid-open No. 2005-161123
Patent document 2: Japanese Patent Publication No. S61-24329
Patent document 3: Japanese Patent Publication No. S58-24378
Patent document 4: Japanese Patent Application Laid-open No. 2003-137552
Non-patent document 1: Tadahisa Nishimura and Kazumitsu Tozawa, Res. Inst. of Mineral Dressing and Metallurgy, Tohoku University, No. 764, Vol. 34, Edition 1, Reprint June 1978.
Non-patent document 2: E. Krause and V. A. Ettel, "Solubilities and Stabilities of Ferric Arsenate Compounds" Hydrometallurgy, 22, 311-337, (1989)
Non-patent document 3: Dimitrios Filippou and George P. Demopoulos, "Arsenic Immobilization by Controlled Scorodite Precipitation" JOM December, 52-55, (1997)

DISCLOSURE OF THE INVENTION

Problems that the Invention is to Solve

In recent years, the global environment for securing raw material ore for use in non-ferrous smelting has become extremely difficult. In the field of copper smelting in particular, the supply is extremely tight because oligopolization by the major non-ferrous manufacturers is progressing, and new major consuming countries such as developing countries are appearing. Under these conditions, environmental regulations are becoming stricter and more obligatory in all countries. The present inventors believe that mines and smelters that can coexist with the environment will be industrially important in the future.

Herein, the pollution that is a concern for non-ferrous smelting includes air pollution due to $SO_2$ gas, as well as soil and waste water pollution by arsenic. With regards to arsenic in particular, the amount of arsenic included in copper ore will increase in the future, so an infallible countermeasure is necessary more than ever. Conventionally, coastal non-ferrous smelters in Japan have been operating without problem by using clean concentrate ore as a processing raw material. However, the amount of arsenic in copper ore is expected to increase in the future. Therefore, extracting arsenic from the system as smelting intermediates and stabilizing and storing arsenic in some form will be necessary.

Therefore, the present inventors researched the aforementioned documents.

For example, in both patent documents 3 and 4, the fundamental reaction of dissolution is the following.

$$Cu^{2+}+\tfrac{1}{3}As_2S_3+\tfrac{4}{3}H_2O=CuS+\tfrac{2}{3}HAsO_2+2H^+ \quad \text{(Equation 1)}$$

As apparent from (Equation 1), in the arsenic leaching disclosed in patent documents 3 and 4, arsenic is leached by directly reacting a copper solution and arsenic sulfide. Moreover, according to patent documents 3 and 4, in order to secure copper ions, either a copper solution is obtained using copper sulfate, or a copper solution is generated in a separate step, and $As_2S_3$ is added to this copper solution (copper is in ionic state) to cause reaction, thereby leaching arsenic. In such reactions, acid appears and becomes concentrated. Therefore, when preparing a concentrated solution of arsenic, the solution will end up having a high acid concentration, too.

Consequently, all of the methods described in the patent documents and the non-patent documents have problems as an arsenic processing method of extracting arsenic from non-ferrous smelting intermediates and converting the arsenic to a stable arsenic compound.

On the other hand, as the arsenic grade in copper ore will increase in the future, in copper smelting the amount of arsenic sulfide residue in a drainage treatment system will increase, and also the load of arsenic on electrolytic copper refineries will increase. Therefore, the amount of smelting intermediates with concentrated arsenic occurring in a copper electrolyte solution purification process is likely to increase, making it difficult to repeatedly process such intermediates in smelters. In light of the foregoing, an object of the present invention is to resolve these problems, and provide a processing method of extracting arsenic from smelting intermediates that contain arsenic, to outside the system in a stable form.

Means to Solve the Problems

The present invention has been developed under such circumstances.

The present inventors conducted diligent research in order to resolve the aforementioned problems. As a result, the present inventors came up with a revolutionary concept of simultaneously processing two types of non-ferrous smelting intermediates that naturally occur in non-ferrous smelting operations, namely, a non-ferrous smelting intermediate containing arsenic in sulfide form and a non-ferrous smelting intermediate containing arsenic and copper as metal.

In addition, the present inventors discovered that an oxidation reaction of oxidizing trivalent arsenic to pentavalent arsenic in a short period of time can be performed by Slowing an oxidized gas into an aqueous solution containing the trivalent arsenic while heating the aqueous solution containing the trivalent arsenic in the presence of the three types of substances that are copper sulfide, copper ions, and copper pentavalent arsenic compounds as catalysts. Moreover, the present inventors confirmed that 99% or more of the trivalent arsenic is oxidized to a pentavalent form at the stop of this oxidation reaction, and have thus achieved the present invention.

In other words, the first means for resolving the aforementioned problems is a method of processing non-ferrous smelting intermediates containing arsenic, comprising: a leaching step of performing oxidation leaching of a mixture slurry in an acidic region to obtain a leaching solution, the mixture slurry being a mixture of a non-ferrous smelting intermediate containing arsenic in sulfide form and a non-ferrous smelting intermediate containing arsenic and copper as metal; a solution adjusting step of adding an oxidation agent to the leaching solution to oxidize trivalent arsenic to pentavalent arsenic and obtain an adjusted solution; and a crystallizing step of converting arsenic in the adjusted solution to scorodite crystals.

The second means is the method according to the first means, wherein the non-ferrous smelting intermediate containing arsenic and copper as metal is decoppered electrolytic slime.

The third means is the method according to the first or second means, wherein the leaching step comprises: a first leaching step of performing leaching while maintaining a pH in a range of 1.0 to 2.0 at a temperature of 80° C. or lower, while blowing air, oxygen gas, or a gas mixture of air and oxygen gas to the mixture slurry of the non-ferrous smelting intermediate containing arsenic in sulfide form and the non-ferrous smelting intermediate containing arsenic and copper as metal; a second leaching step of, following the first leaching step, adding sodium hydroxide to bring the pH to not lower than 2.0, and performing leaching for 30 minutes or longer at a temperature of 80° C. or lower while blowing air, oxygen gas, or a gas mixture of air and oxygen gas to the mixture slurry, without maintaining the pH; and a third leaching step of, following the second leaching step, performing leaching for 30 minutes or longer at a temperature of 80° C. or higher.

The fourth means is the method according to the first or second means, wherein the leaching step comprises: a first leaching step of performing leaching while maintaining a pH in a range of 1.0 to 2.0 at a temperature of 80° C. or lower, while blowing air, oxygen gas, or a gas mixture of air and oxygen gas to the mixture slurry of the non-ferrous smelting intermediate containing arsenic in sulfide form and the non-ferrous smelting intermediate containing arsenic and copper as metal; a second leaching step of, following the first leaching step, adding sodium hydroxide to bring the pH to not lower than 2.0, and performing leaching for 30 minutes or longer at a temperature of 80° C. or lower while blowing air, oxygen gas, or a gas mixture of air and oxygen gas to the mixture slurry, without maintaining the pH; a third leaching step of, following the second leaching step, performing leaching for 30 minutes or longer at a temperature of 80° C. or higher; and a fourth leaching step of, following the third leaching step, stopping the blowing of the gas mixture and further performing mixing for 10 minutes or longer.

The fifth means is the method according to any of the first to fourth means, wherein the solution adjusting step is a solution adjusting step of adding hydrogen peroxide to the leaching solution at a temperature of 40° C. or higher to oxidize the trivalent arsenic to the pentavalent arsenic, and then bringing the reacted solution into contact with metallic copper to remove residual hydrogen peroxide.

The sixth means is the method according to any of the first to fifth means, wherein the crystallizing step is a crystallizing step of adding and dissolving ferrous ($Fe^{2+}$) salt into the adjusted solution, and causing an oxidation reaction.

The seventh means is the method according to any of the first to sixth means, wherein the oxidation reaction is performed in a pH range of 1 or lower.

The eighth means is the method according to any of the first to seventh means, wherein the oxidation reaction is performed at a solution temperature of 50° C. or higher.

The ninth means is the method according to any of the first to eighth means, wherein the oxidation reaction is blowing of air, oxygen gas, or a gas mixture of air and oxygen gas.

The tenth means is an arsenic oxidation method, wherein air and/or oxygen gas is blown into a solution to oxidize trivalent arsenic in the solution to pentavalent arsenic, the solution containing diarsenic trioxide ($As_2O_3$) and/or arsenous acid ions, being heated to 50° C. or higher, having a pH of not less than 1 in a neutral region, and comprising copper sulfide, copper ions, and a copper pentavalent arsenic compound.

The eleventh means is an arsenic oxidation method, wherein by blowing air and/or oxygen gas into a solution that contains diarsenic trioxide ($As_2O_3$) and/or arsenous acid ions, is heated to 50° C. or higher, has a pH of not less than 2 in a neutral region, and comprises copper sulfide, trivalent arsenic in the solution is oxidized to pentavalent arsenic, while generating the copper pentavalent arsenic compound by dissolving a portion of the copper sulfide.

The twelfth means is the arsenic oxidation method according to the tenth or eleventh means, wherein the pH is not less than 2 when the blowing of air and/or oxygen gas starts, and less than 2 when the blowing of air and/or oxygen gas ends.

The thirteenth means is the arsenic oxidation method according to any of the tenth to twelfth means, wherein after the trivalent arsenic in the solution is oxidized to the pentavalent arsenic, the solution produced by pulp is filtered and a filtering residue is recovered, and the filtering residue is used as a substitute for the copper sulfide.

The fourteenth means is the arsenic oxidation method according to any of the tenth to thirteenth means, wherein after the trivalent arsenic in the solution is oxidized to the pentavalent arsenic, the solution produced by pulp is neutralized to bring the pH to not less than 3 and thereby crystallize the copper ions in the solution as the copper pentavalent arsenic compound, and then filtering is performed to recover a filtrate and a filtering residue, and the filtering residue is used as a substitute for the copper sulfide.

EFFECTS OF THE INVENTION

According to any of the first to ninth means, it is possible to extract arsenic from a non-ferrous smelting intermediate containing arsenic in sulfide form and a non-ferrous smelting intermediate containing arsenic and copper as metal, and process the arsenic to easily-filterable and stable scorodite crystals.

Also, according to any of the tenth to fourteenth means, trivalent arsenic can be oxidized to pentavalent arsenic at an oxidation rate of 99% or more with low operation costs and low equipment costs, by using materials that are easily obtainable in non-ferrous smelters. Furthermore, according to the present invention, the pH of the solution at the stop of the oxidation reaction is not less than 1 and below 2, which is favorable for producing scorodite (FeAsO$_4$·2H$_2$O). In this respect, too, the present invention contributes to low operation costs and low equipment costs.

BEST FORM FOR CARRYING OUT THE INVENTION

As described above, the present invention relates to an arsenic processing method of extracting arsenic from a non-ferrous smelting intermediate containing arsenic in sulfide form and a non-ferrous smelting intermediate containing arsenic and copper as metal, and processing the arsenic to easily-filterable and stable scorodite crystals.

The present invention also relates to a method of oxidizing trivalent arsenic to pentavalent arsenic at an oxidation rate of 99% or more with low operation costs and low equipment costs.

Hereinafter, with regard to a best mode for carrying out the present invention, the 1. Non-ferrous smelting intermediates containing arsenic; 2. Leaching step; 3. Solution adjusting step; 4. Crystallizing step; and Example 1 will be described in order in detail while referring to the flowchart shown in FIG. 1.

Next, with regard to the method of oxidizing trivalent arsenic to pentavalent arsenic at an oxidation rate of 99% or more with low operation costs and low equipment costs as a second embodiment, the 1. Processing object; 2. Oxidation reaction of trivalent arsenic; 3. pH of the trivalent arsenic at the beginning of the oxidation reaction; 4. pH of the trivalent arsenic at the stop of the oxidation reaction; and Examples 2 to 6 and Comparative Examples 1 to 5 will be described in order in detail while referring to the flowchart shown in FIG. 2, and further the 5. Trivalent arsenic oxidation reaction model conceived by the present inventors will be described.

1. Non-Ferrous Smelting Intermediates Containing Arsenic

The non-ferrous smelting intermediate containing arsenic in sulfide form (1) refers to the residue recovered by causing smelting step water or waste water containing arsenic to react with a sulfidizing agent. Examples of the sulfidizing agent include hydrogen sulfide, sodium hydrogen sulfide, and sodium sulfide.

The non-ferrous smelting intermediate containing arsenic and copper as metal (2) is, for example, decoppered electrolytic slime.

Decoppered electrolytic slime will be described in more detail below.

Decoppered electrolytic slime is the residue generated as a result of the electrolytic deposition of copper, arsenic, and the like as slugged metal in a solution purification step (step of collecting and removing impurities such as arsenic which are accumulated in an electrolytic copper solution by electrowinning) performed in electrolytic copper refineries. This electrolytic copper solution purification step by electrowinning is a commonly-used method in electrolytic copper refineries. Therefore, decoppered electrolytic slime is the residue that naturally occurs in order to ensure the quality of electrolytic copper.

In each smelter, this decoppered electrolytic slime is processed by being returned to a dry copper smelter which is a preceding step of an electrolytic copper refinery. However, this results in the situation where arsenic circulates between the electrolytic copper refinery and the dry copper smelter, making the final treatment of the arsenic problematic. This problem will become more serious in the future.

2. Leaching Step

The leaching step (3) is a step of extracting arsenic from the non-ferrous smelting intermediate containing arsenic in the sulfide form (1) and/or the non-ferrous smelting intermediate containing arsenic and copper as metal (2), to obtain a solution containing arsenic (4).

First, the present inventors examined a method of performing oxidation dissolution of decoppered electrolytic slime in the acidic region and dissolving arsenic sulfide using the obtained copper solution.

However, when attempting to obtain a high arsenic concentration solution necessary for producing scorodite crystals according to this method, this solution became a strong acid solution. For example, in the case of preparing a solution with an arsenic concentration of 47 g/l in the reaction of the above (Equation 1), the acid concentration of that solution is computed as 184 g/l, and, on a pH basis, the strong acid solution having a pH of −0.57 (negative) is obtained.

Scorodite which is an arsenic compound is difficult to produce in the strongly acidic region. Therefore, the obtained arsenic solution is required to be neutralized to a pH of about 1, by adjusting the pH. However, in the case of using NaOH for neutralization, the amount of NaOH used increases significantly, and the Na concentration in the solution after the pH adjustment becomes higher. This causes an increase in viscosity of the solution in the crystallizing step (6) described later. As a result, mixing and the like cannot be performed, and scorodite (7) cannot be obtained. Furthermore, in order to ensure the high leaching rate of arsenic sulfide in this leaching method, a large amount of copper needs to exist in the solution at the stop of leaching. As a result, it becomes necessary to provide a copper recovery step separately.

In view of this, the present inventors conducted diligent research for a leaching method that minimizes the amount of sulfuric acid or NaOH used, and also enables the preparation of a high arsenic concentration solution.

As a result of the research, the present inventors discovered a reaction process exemplified by the following (Equation 2).

$$Cu^0 + \tfrac{1}{3}As_2S_3 + \tfrac{1}{2}O_2 + \tfrac{1}{3}H_2O = \tfrac{2}{3}HAsO_2 + CuS \quad \text{(Equation 2)}$$

(Note, Cu$^0$ denotes copper as metal.)

As a result of analyzing the reaction process exemplified by the above (Equation 2) in detail, the challenges [1] to [3] when preparing a high arsenic concentration solution using the reaction process became clear.

[1] Not to deposit crystals even after the obtained solution (4) is cooled. This is because the operations become impossible if crystals are deposited at the time of filtering and the like in the actual operations.

[2] To suppress elution of impurities, especially lead, from the eventually obtained arsenic crystals (scorodite (7)).

[3] To choose a wide range of Cu raw materials as metal for obtaining a high arsenic concentration leaching solution (4) using this reaction process.

The present inventors addressed these challenges [1] to [3] by the following invention.

[1] The oxidation from trivalent arsenic of low solubility to pentavalent arsenic of high solubility in the arsenic contained in the obtained solution (4) is actively promoted.

Specifically, by dividing the leaching step (3) into three stages, it becomes possible to increase the oxidation efficiency. With regard to unoxidized trivalent arsenic, by adding an appropriate amount of NaOH to the leaching solution at the time of leaching in a range that does not affect the crystallization in the crystallizing step (6) (in detail, the amount of NaOH added is limited so that the Na concentration in the solution does not exceed 15 g/l), the solubility of the trivalent arsenic is increased. As a result, the increase in viscosity of the leaching solution (4) in the crystallizing step (6) can be suppressed.

[2] Not only arsenic but also lead is a problem as an elution element from the scorodite (7). This is because the lead in the leaching solution (4) forms lead sulfate with a large amount of sulfate radical of ferrous salt sulfate prepared in the crystallizing step, and this lead sulfate mixes in the scorodite (7).

An excessive amount of lead elution to the leaching solution can be prevented by limiting the oxidation from trivalent arsenic in the leaching solution (4) to pentavalent arsenic to no more than 90% to avoid the solution from becoming the peroxidative state, and also appropriately mixing the arsenic sulfide residue which is the non-ferrous smelting intermediate containing arsenic in sulfide form (1) and the decoppered electrolytic slime which is the non-ferrous smelting intermediate containing arsenic and copper as metal (2) and causing reaction.

The appropriate mixing between the non-ferrous smelting intermediate containing arsenic in sulfide form (1) and the non-ferrous smelting intermediate containing arsenic and copper as metal (2) will be described below.

When the reaction is supposed to be performed according to the above (Equation 2) and the amount of $As_2S_3$ in stoichiometric amount necessary for the reaction is 1 equivalent, at least 1 equivalent of the stoichiometric amount is necessary, and at least 1.1 equivalents of the stoichiometric amount is more preferable. By mixing $As_2S_3$ more than the stoichiometric amount, the lead elution can be reduced to a low level. Though the cause of this phenomenon is unknown, it can be thought that by mixing $As_2S_3$ more than the stoichiometric amount, the amount of monatomic sulfur in the leaching residue (8) increases, and this monatomic sulfur acts.

Note, the leaching residue (8) can be returned to the copper smelting step (9).

[3] In the reaction process exemplified in the above (Equation 2), it can be considered that the reaction is possible even when pure copper is used as the copper as metal. That is, the reaction progresses even by causing pure copper such as copper filings to coexist and inducing the oxidation leaching of arsenic sulfide pulp in the acidic region. Furthermore, regarding the copper as metal, decoppered electrolytic slime is naturally generated in copper smelters. In addition, arsenic is concentrated in this decoppered electrolytic slim. Therefore, the use of the non-ferrous smelting intermediate containing the arsenic and the copper as metal (2) as a copper raw material is preferable because arsenic can be concentrated easily and also because the processing cost can be reduced. Moreover, the copper in the decoppered electrolytic slime includes not only copper as a simple substance but also a significant amount of copper as copper arsenide which is an intermetallic compound. Even when copper is in alloy form such as copper arsenide, it can be used as a copper raw material so long as it can be dissolved by oxidation leaching in the acidic condition. Therefore, the use of such copper in alloy form is preferable in terms of higher arsenic concentration and also in terms of cost. Note, copper arsenide is generated in the de-arsenic process in wet zinc smelting in many cases, and such copper arsenide is suitable as a copper raw material according to the present invention.

The operation in the leaching step (3) will be further exemplified below.

In the first leaching step, the non-ferrous smelting intermediate containing arsenic in sulfide form (1) and the non-ferrous smelting intermediate containing arsenic and copper as metal (2) are mixed together to form a mixture slurry. As described above, the composition of each non-ferrous smelting intermediate is such that the arsenic in sulfide form is not less than 1 equivalent of the stoichiometric amount in the reaction of the above (Equation 2), with respect to the copper as metal contained in the non-ferrous smelting intermediate. When the metal copper content is unknown, the copper content may be assumed to be approximately the metal copper content. The same applies to arsenic sulfide.

Acid may be added when or after preparing the mixture slurry. By adding acid, the leaching of decoppered electrolytic slime can be promoted. Sulfuric acid is preferably used as this acid. The addition of the acid may be performed so that the pH of the mixture slurry is approximately in a range of 1 to 2. This enables the leaching of decoppered electrolytic slime to be performed sufficiently. In particular, the pH of about 1 is also preferable in the subsequent arsenic crystallizing step (6).

Eventually, the present inventors found that sufficient oxidation leaching is possible in the first leaching step even when the acidic condition is the pH of 1 to 2 which is not very low as described above and also the temperature of the mixture slurry at the time of leaching is no more than 80° C.

The leaching temperature which is the temperature of the mixture slurry was measured experimentally. The leaching period was 120 minutes. Under the same conditions of the raw material, composition, and pH of 1 to 2 as the leaching condition, the final leaching rate was measured as a mass ratio by changing the leaching temperature as 90, 80, 65, and 50° C. The results were 91.0%, 91.4%, 91.6%, and 91.2%, which are not different much from each other. The reason why the high leaching rate can be obtained even when the pH is not sufficiently low and the solution temperature is not high is estimated to be that the primary particle of decoppered electrolytic slime is extremely fine such as 10 to 30 μm which contributes to excellent reactivity.

More noteworthy is that the reaction of the above (Equation 2) is neither a reaction of acid generation nor a reaction of acid consumption. Therefore, it is thought that, once the leaching pH is set in the beginning of the reaction, the reaction progresses while maintaining the pH. However, in the actual reaction the pH decreases gradually. Note, the specific reaction of this pH decrease is still unknown.

For the above reason, in the first leaching step, while not maintaining the pH, the careful examination of the condition is required to maintain the pH between 1 and 2 from the perspective of ensuring the aforementioned leaching rate and also from the perspective of keeping the pH range at the time of leaching.

Note, the pH decreases as the reaction progresses, and there is a possibility that the pH eventually becomes no more than 1. However, separating the basic reaction of (Equation 2) into elementary reactions yields (Equation 3), (Equation 4), and (Equation 5).

$$(Cu^0) + 2H^+ + \tfrac{1}{2}O_2 = Cu^{2+} H_2O \quad \text{(Equation 3))}$$

$$(As^0) + \tfrac{3}{4}O_2 + \tfrac{1}{2}H_2O = HAsO_2 \quad \text{(Equation 4)}$$

$$Cu^{2+} + \tfrac{1}{3}As_2S_3 + \tfrac{4}{3}H_2O = CuS + \tfrac{2}{3}HAsO_2 + 2H^+ \quad \text{(Equation 5)}$$

This being so, the effective measure to suppress the pH decrease was considered to be that the progress of (Equation 3) is promoted to consume acid and the progress of (Equation 5) is suppressed to prevent acid generation.

As a result of the above analysis and repeated trial and error, it was found that when the leaching temperature is 80 to 90° C., the pH decreases greatly with the progress of the leaching reaction and the pH of the leaching solution (4) easily falls below 1, which causes unstable management and an increase of NaOH use in the second leaching step. On the other hand, when the leaching temperature is no more than 80° C. and more preferably no more than 70° C., the pH decrease is small irrespective of the progress of the leaching reaction, so that the management can be performed stably and the pH of the leaching solution (4) can be reliably limited in the range of 1 to 2.

Consequently, by setting the pH in the beginning of the leaching to a little less than 2 by making the leaching temperature no more than 80° C., the pH in the end of the first leaching step can be always not less than 1, and the pH can be in the range of 1 to 2 without having to control the pH at the time of leaching. Note, the pH control when the leaching start is performed by adding a predetermined amount of sulfuric acid. In addition, to ensure the leaching rate in the first leaching step, the first leaching step is preferably conducted for at least 30 minutes.

After leaching arsenic generated in the first leaching step, leaching is further performed on the slurry in the second leaching step, to further leach arsenic and promote oxidation from trivalent arsenic to pentavalent arsenic, while removing copper dissolved in the leaching solution.

Several g/l of copper exists in the leaching solution in the end of the first leaching step, which needs to be removed.

In addition, merely about 30% of leached arsenic has been oxidized to pentavalent arsenic.

In the second leaching step, NaOH is added to the mixture slurry generated in the first leaching step, to bring the pH of the mixture slurry to not less than 2.0. By increasing the pH, the oxidation from trivalent arsenic to pentavalent arsenic is promoted. This is because arsenic is more easily oxidized when closer to the neutral region than the acidic region.

As in the first leaching step, the temperature of the mixture slurry in the second leaching step does not need to be a very high temperature, and is preferably no more than 80° C. Typically, the oxidation of trivalent arsenic to pentavalent arsenic is better when the temperature is higher. However, the result of this research is opposite. Though the specific reason why the temperature of the mixture slurry in the second leaching step is preferably no more than 80° C. is unknown, there is a possibility that this may derive from the complexity of the raw material components.

As a test, the second leaching step was conducted using the mixture slurry produced in the first leaching step, under the condition where only the temperature was changed.

Raw material samples having the same composition were prepared, and the temperature and the leaching period of the first leaching step were set at 60° C. and 120 minutes, respectively. On the other hand, the temperature of the second leaching step was changed as 90° C., 80° C., 70° C., and 60° C., with the leaching period being 45 minutes. The oxidation conversion rate from trivalent arsenic to pentavalent arsenic in the second leaching step was examined in each of the leaching temperatures of 90° C., 80° C., 70° C., and 60° C. The results of oxidation conversion rate from trivalent arsenic to pentavalent arsenic are shown in Table 1.

TABLE 1

| Reaction temperature (° C.) | Oxidation rate (%) |
|---|---|
| 90 | 5.5 |
| 80 | 30.4 |
| 70 | 53.0 |
| 60 | 57.1 |

From the results of Table 1, it was seen that the oxidation rate from trivalent arsenic to pentavalent arsenic sharply decreases at the temperature of 80° C. or more. Consequently, it was confirmed that the leaching temperature in the second leaching step has an upper limit, and the oxidation rate from trivalent arsenic to pentavalent arsenic is high when the temperature is a low temperature of no more than 80° C. Note, the pH decreases with the progress of (Equation 5) in the entire reaction, as described above. However, the pH never fell below 1.

The reaction period of the second leaching step should be 30 minutes or more and preferably 45 minutes or more, from the perspective of sufficiently ensuring the progress of the reaction.

The third leaching step is a step of removing copper from the mixture slurry produced through the first and second leaching steps. The mixture slurry produced through the first and second leaching steps still contains several 10 mg/l to 1 mg/l of copper. Therefore, it is necessary to remove the remaining copper to be no more than 50 mg/l. An increase in the temperature of the third leaching step was conceived to be effective for this purpose. In the third leaching step, the temperature is preferably not less than 80° C., and the reaction is preferably performed for 30 minutes or more. As a result, the copper can be removed so that the copper content is about several mg/l.

As a test, the copper concentration in the final leaching solution was measured while changing only the reaction temperature of the third leaching step. The same raw material sample was used in each test, and the leaching temperature and period of the first leaching step were 60° C. and 120 minutes and the leaching temperature and period of the second leaching step were 60° C. and 45 minutes. The mixture slurry samples obtained under this condition were put to the leaching test in which the leaching temperatures were 90° C., 80° C., and 70° C. and the leaching period was 45 minutes. The results are shown in Table 2.

TABLE 2

| Reaction temperature (° C.) | Reaction period (minutes) | Copper concentration (mg/l) |
|---|---|---|
| 90 | 45 | 1 |
| 80 | 45 | 6 |
| 70 | 45 | 233 |

As apparent from Table 2, it was seen that the copper concentration sharply drops when the reaction temperature is 80° C. or more, so that the reaction temperature is preferably not less than 80° C. Note, a pH decrease was also seen in the third leaching step, but the pH never fell below 1 at the stop of the leaching reaction. Moreover, it was found that this pH is a preferable pH for the subsequent step. Furthermore, since the pH never fell below 1, the pH adjustment in the subsequent step can be performed easily, and the amount of agent used for pH adjustment can be reduced. That is, an extremely favorable arsenic solution for arsenic processing can be obtained.

The fourth leaching step is a step that is preferably provided in the case when a lot of mercury is contained in the raw material which is the processing target, and in the case when a small quantity of copper remaining in the third leaching step needs to be removed stable and completely.

Specifically, by stopping blowing of a gas mixture such as oxygen gas, the small quantity of mercury dissolved in the leaching solution (4) from the raw material and the remaining copper in the leaching solution (4) are removed by sulfidation reaction shown in (Equation 6) and (Equation 7).

$$Hg^{2+}+\tfrac{1}{3}S+\tfrac{4}{3}H_2O=HgS+\tfrac{1}{3}SO_4^{2-}+\tfrac{8}{3}H^+ \quad \text{(Equation 6)}$$

$$Cu^{2+}+\tfrac{1}{3}S+\tfrac{4}{3}H_2O=CuS+\tfrac{1}{3}SO_4^{2-}+\tfrac{8}{3}H^+ \quad \text{(Equation 7)}$$

Which is to say, S (sulfur) contained in the leaching residue (8) is utilized as the sulfurizing agent.

Note, S (sulfur) is generated when arsenic sulfide which is mixed in an amount that exceeds the reaction equivalent shown in (Equation 2) dissolves according to the following (Equation 8).

$$As_2S_3+\tfrac{3}{2}O_2+H_2O=2HAsO_2+3S \quad \text{(Equation 8)}$$

By providing the fourth leaching step for the reaction period of 10 minutes or more, for example the copper can be stably removed to about 1 mg/l even when the reaction temperature is 80° C.

3. Solution Adjusting Step

The solution adjusting step (5) is a step comprising an oxidizing step of adding hydrogen peroxide to the leaching solution (4) obtained in the above leaching step (3) to oxidize unoxidized trivalent arsenic contained in the leaching solution (4) to pentavalent arsenic, and a deoxidizing step of removing hydrogen peroxide remaining in the solution after the oxidation.

(Oxidizing Step)

According to research by the present inventors, air or oxygen gas has only weak oxidizing power as an oxidation agent for oxidizing trivalent arsenic almost completely to pentavalent arsenic. In view of this, the present inventors employed hydrogen peroxide ($H_2O_2$) which is commonly used as an oxidation agent. Hydrogen peroxide used may be a standard product with a concentration in a range of 30% to 35%.

Oxidation of trivalent arsenic by hydrogen peroxide is shown in (Equation 9) and (Equation 10).

$$HAsO_2+H_2O_2=H_2AsO_4^-+H^+ \quad \text{(Equation 9)}$$

$$HAsO_2+H_2O_2=H_3AsO_4 \quad \text{(Equation 10)}$$

The time required for adding hydrogen peroxide may be 5 minutes or more to suppress the generation of gas bubbles due to partial decomposition and thereby increase the effect of addition. More preferably, the time required for adding hydrogen peroxide is between 10 and 15 minutes.

The amount of hydrogen peroxide added may be in a range of 1 to 1.1 equivalents of the stoichiometric amount necessary for trivalent arsenic oxidation reaction.

The oxidation of trivalent arsenic by hydrogen peroxide is extremely fast, and an increase in the temperature due to the heat of reaction as well as a reduction in the pH can be observed during the addition. Therefore, if the addition of hydrogen peroxide is started at the temperature of 65 to 70° C., the temperature increases close to 80° C. by the end of the addition (though dependent on the trivalent arsenic concentration).

It is crucial to take the reaction time of not less than 60 minutes after the completion of the hydrogen peroxide addition, from the perspective of achieving complete oxidation.

(Deoxidizing Step)

The deoxidizing step is a step of removing hydrogen peroxide remaining in the solution obtained as a result of the above oxidizing step.

After the above oxidizing step of oxidizing unoxidized trivalent arsenic to pentavalent arsenic, the residual hydrogen peroxide in the solution after the oxidation would oxidize a portion of the ferrous salt that is added in the subsequent crystallizing step (6), and therefore it is preferable to remove the residual hydrogen peroxide in order to accurately manage the ferrous ion concentration.

To remove the residual hydrogen peroxide in the solution after the oxidation, a method of decomposing the hydrogen peroxide by adding a metal colloid of gold or silver or the like can be conceived. However, this method is not suitable for actual operations, because of losses due to handling and the like.

Therefore, the present inventors came up with a concept of removing not by decomposition but by consumption, and studied this method. As a result, the present inventors confirmed that the method of bringing the residual hydrogen peroxide in the solution into contact with metallic copper in order to remove the hydrogen peroxide by consumption according to the reaction shown in (Equation 11) is the most rational method.

$$Cu^0+H_2O_2+H_2SO_4=CuSO_4+2H_2O \quad \text{(Equation 11)}$$

The reaction temperature is preferably 40° C. or more in order to complete the reaction.

The reaction time can be considered to be complete when the pH reaches a certain value. This is because the reaction will proceed in conjunction with an increase in the pH as shown in (Equation 11).

4. Crystallizing Step

The crystallizing step (6) is a step of crystallizing the arsenic in the adjusted solution obtained in the solution adjusting step (5) to scorodite (7).

The adjusted solution after the solution adjusting step (5) is completed is preferably a concentrated solution with an arsenic concentration of 30 g/l or higher, and more preferably 40 g/l or higher, in view of the productivity of scorodite (7).

First, ferrous salt ($Fe^{2+}$) is added to the adjusted solution after the solution adjusting step (5) and dissolved, and sulfuric acid ($H_2SO_4$) is added at a room temperature to adjust the pH to 1.

At this point, various types of ferrous salt are possible, but ferrous sulfate is preferable since it would not put a load on the corrosion resistance of the equipment and is a widely used agent.

The amount of ferrous sulfate, calculated as a pure iron quantity, added may be equal to or greater than one times and preferably 1.5 times the number of moles of arsenic to be treated. The amount of ferrous sulfate added may be 1.5 times the number of moles of arsenic to be treated, in terms of cost.

After the above mixture, the adjusted solution is heated to a prescribed reaction temperature. At this time, the scorodite (7) can be deposited if the reaction temperature is at least 50° C. However, because the scorodite (7) particle size increases when the reaction temperature is higher, the reaction temperature is preferably between 90 and 100° C. to which the temperature can be increased under atmospheric conditions.

When the adjusted solution reaches a prescribed reaction temperature, blowing of air, oxygen gas, or a gas mixture thereof is started, a gas liquid mixture is created by a vigorous mixing and a crystallizing reaction by high temperature oxidation proceeds while maintaining a prescribed reaction temperature.

The crystallizing reaction is mostly determined by the following estimation equations (Equation 12) to (Equation 17) in about 2 to 3 hours. The redox potential of the solution is 400 mV or higher (Vs; Ag/AgCl) at 95° C. Furthermore, 90% or more of the arsenic will be converted to scorodite.

(First Half of the Reaction)

$$2FeSO_4+\tfrac{1}{2}O_2+H_2SO_4=Fe_2(SO_4)_3+H_2O \quad \text{(Equation 12)}$$

$$2H_3AsO_4+Fe_2(SO_4)_3+4H_2O=2FeAsO_4.2H_2O+3H_2SO_4 \quad \text{(Equation 13)}$$

The complete reaction (Equation 12 and Equation 13) is shown by the equation below.

$$2H_3AsO_4+2FeSO_4+\tfrac{1}{2}O_2+3H_2O=2FeAsO_4.2H_2O+2H_2SO_4 \quad \text{(Equation 14)}$$

(Second Half of the Reaction after the as Concentration Drops)

$$2FeSO_4 + \tfrac{1}{2}O_2 + H_2SO_4 = Fe_2(SO_4)_3 + H_2O \quad \text{(Equation 15)}$$

$$\tfrac{2}{3}H_3AsO_4 + \tfrac{1}{3}Fe_2(SO_4)_3 + \tfrac{4}{3}H_2O = \tfrac{2}{3}FeAsO_4 \cdot 2H_2O + H_2SO_4 \quad \text{(Equation 16)}$$

The complete reaction (Equation 15 and Equation 16) is shown by the equation below.

$$\tfrac{2}{3}H_3AsO_4 + 2FeSO_4 + \tfrac{1}{2}O_2 + \tfrac{4}{3}H_2O = \tfrac{2}{3}FeAsO_4 \cdot 2H_2O + \tfrac{2}{3}Fe_2(SO_4)_3 \quad \text{(Equation 17)}$$

Although dependent on the oxidation method, the pH, arsenic concentration, and iron concentration in the solution will drop rapidly between 2 and 3 hours after the start of the reaction. At this stage, the redox potential of the solution is 400 mV or higher (Vs; Ag/AgCl) at 95° C. This indicates that 90% or more of the arsenic that is contained in the solution has completed the conversion to scorodite. After this, the arsenic remaining in the solution will only decrease by a small amount even when the crystallizing reaction is continued, and there will be almost no change in the pH and the redox potential of the solution.

Note, the crystallizing reaction is preferably completed between 5 and 7 hours in order to reach equilibrium.

On the other hand, the filtrate (10) can be processed in the waste water processing step (11).

As described in detail above, according to the present invention, both of the non-ferrous smelting intermediate containing arsenic in sulfide form (1) and the non-ferrous smelting intermediate containing arsenic and copper as metal (2) can be processed simultaneously without repeating a smelting process. In addition, the arsenic contained is converted to scorodite which is a stable substance, so that the arsenic can be managed and stored stably. This provides the efficient measure against the increase of arsenic grade in copper ore in the future, and also delivers significant effects for environmental protection.

EXAMPLE

The present invention will be described below more specifically while presenting examples.

Example 1

<Leaching>
(First Leaching Step)

553 wet·g of an arsenic sulfide residue whose grade is shown in Table 3 and 113 dry·g of decoppered electrolytic slime whose grade is shown in Table 4 were measured in a 2 liter beaker (with four baffles), and pure water of 1,210 ml was added to form a slurry (pH 2.48 at 26° C.). The amount of arsenic sulfide in this composition is about 1.3 equivalents of the stoichiometric amount of the above (Equation 2).

Note, the decoppered electrolytic slime used was obtained by crushing the coagulation in a dried state using a cutter mill to below 710 μm beforehand. Unless specified otherwise, the chemical analysis values are the values measured using an ICP analysis device, and (%) denotes (mass %).

TABLE 3

| | Element | | | | | | | | |
|---|---|---|---|---|---|---|---|---|---|
| | As (%) | Cu (%) | S (%) | Pb (%) | Sb (%) | Zn (%) | Bi (%) | Cd (%) | Water content (%) |
| Content | 24.9 | 25.3 | 36.4 | 1.89 | 0.46 | 0.52 | 0.82 | 0.44 | 61.8 |

TABLE 4

| | Element | | | | | | | | |
|---|---|---|---|---|---|---|---|---|---|
| | As (%) | Cu (%) | S (%) | Pb (%) | Sb (%) | Zn (%) | Bi (%) | Cd (%) | Ni (%) |
| Content | 22.6 | 46.0 | 2.95 | 1.34 | 1.32 | 0.05 | 1.26 | 0.004 | 0.6 |

Next, 95% sulfuric acid ($H_2SO_4$) of 16.3 g was added to the slurry. At this point, the pH was 1.47 (at 29° C.). Further, the slurry was heated to 50° C. At this point, the pH was 1.43 (at 50° C.). Following this, while vigorously mixing, oxygen gas blowing was started by blowing in oxygen gas at a rate of 430 ml/min using a glass tube from the bottom of the beaker, and leaching was performed for 120 minutes while maintaining the temperature at 50° C. At this point, the pH was 1.38 (at 50° C.). The result of sampling a small amount of slurry and performing a solution analysis here is shown in Table 5. Note, T—As denotes the total amount of arsenic.

TABLE 5

| | Element | | |
|---|---|---|---|
| | T-As (g/l) | Trivalent As (g/l) | Cu (g/l) |
| Content | 39.2 | 25.4 | 7.9 |

(Second Leaching Step)

Following the first leaching step, 61 ml of NaOH solution with a concentration of 500 g.NaOH/l was added to the leaching slurry to perform neutralization. The pH immediately after the neutralization was 3.81 (at 59° C.).

Next, the leaching temperature was adjusted to 60° C. at a constant temperature and, while blowing the same amount of oxygen gas as in the first leaching step, leaching was performed for 45 minutes and then the second leaching step was completed. At this point, the pH was 2.26 (at 60° C.). The result of sampling a small amount of slurry and performing a solution analysis here is shown in Table 6.

TABLE 6

| | Element | | |
|---|---|---|---|
| | T-As (g/l) | Trivalent As (g/l) | Cu (g/l) |
| Content | 42.2 | 11.3 | 1.1 |

(Third Leaching Step)

Following the second leaching step, the temperature of the slurry was increased to 80° C. and, while blowing the same amount of oxygen gas as in the first and second leaching steps, leaching was performed for 45 minutes with the temperature being maintained at 80° C., and then the third leaching step was completed. At this point, the pH was 2.03 (at 80° C.). The result of sampling a small amount of slurry and performing a solution analysis here is shown in Table 7.

TABLE 7

| | Element | | | | | | | | | |
|---|---|---|---|---|---|---|---|---|---|---|
| | T-As (g/l) | Trivalent As (g/l) | Cu (mg/l) | Na (g/l) | Pb (mg/l) | Sb (mg/l) | Zn (mg/l) | Bi (mg/l) | Cd (mg/l) | Ni (mg/l) | S (g/l) |
| Content | 45.9 | 11.0 | 8 | 11.7 | 40 | 113 | 559 | 3 | 413 | 438 | 9.2 |

The weight of the recovered leaching residue was 560 wet·g (with 64% water content). The grade of the leaching residue after washed with water is shown in Table 8. The leaching rate calculated from Table 8 was 91.8%.

TABLE 8

| | Leaching residue grade | | |
|---|---|---|---|
| | Element | | |
| | As (%) | Cu (%) | S (%) |
| Content | 3.2 | 51.1 | 28.7 |

<Solution Adjustment>
(Oxidation)

1,000 ml of the leaching solution obtained as a result of the first to third leaching steps was placed in a 1 (L) beaker, and hydrogen peroxide of 1.05 equivalents of the amount necessary for oxidizing trivalent arsenic contained was added.

Specifically, 17.5 g of hydrogen peroxide water with a 30% concentration was added for 12 minutes starting from the moment the temperature of the leaching solution reached 60° C. The redox potential of the leaching solution at this point was 526 mV (Vs; Ag/AgCl) at 81° C. Note, the mixing was performed weakly to the degree that air did not get mixed in.

The changes in leaching solution temperature, pH, and redox potential (Vs; Ag/AgCl) in the oxidation reaction are shown in Table 9.

TABLE 9

| | Elapsed time (min) | | | | | |
|---|---|---|---|---|---|---|
| | Reaction start 0 | 5 | 15 | 30 | 45 | Reaction end 48 |
| Temperature (° C.) | 81 | 80 | 81 | 80 | 80 | 80 |
| pH | 1.94 | 1.91 | 1.94 | 1.91 | 1.90 | 1.90 |
| Redox potential (mV) | 526 | 483 | 452 | 438 | 414 | 410 |

(Deoxidation)

Following the solution adjustment, the dehydroperoxidation process was performed for the entire solution after the above oxidation reaction, thereby obtaining the adjusted solution.

Extra pure reagent copper powder was used as the dehydroperoxidation agent in this example.

The reaction conditions were such that the reaction temperature was 40° C., and the point immediately after adding 1.8 g of copper powder was set as the start of the reaction.

The changes in solution temperature, pH, and redox potential (Vs; Ag/AgCl) of the oxidation reaction completion solution in the dehydroperoxidation are shown in Table 10.

Note, in the adjusted solution after the dehydroperoxidation, the arsenic concentration was 45.3 g/l, and the copper concentration was increased to 111 mg/l.

TABLE 10

| | Elapsed time (min) | | | | | |
|---|---|---|---|---|---|---|
| | Reaction start Immediately before | Copper powder addition 1 | 2 | 3 | 4 | Reaction end 5 |
| Temperature (° C.) | 41 | | 42 | 42 | 42 | 42 |
| pH | 1.56 | 1.57 | 1.57 | 1.57 | 1.57 | 1.57 |
| Redox potential (mV) | 400 | 196 | 185 | 118 | 99 | 88 |

<Crystallization>

The adjusted solution after the solution adjusting step was diluted with pure water, and the concentration of arsenic was adjusted to 45 g/l. 800 ml of the adjusted solution was transferred to a 2 L beaker, and 95% sulfuric acid was added to bring the pH to 1.15. The amount of ferrous salt ($Fe^{2+}$) added here had the number of moles of 1.5 times the number of moles of arsenic contained.

Specifically, 200 g of extra pure reagent ferrous sulfate ($FeSO_4 \cdot 7H_2O$) was added to the adjusted solution and dissolved, and then 95% sulfuric acid was added to bring the pH to 1.0 at a temperature of 30° C.

Subsequently, the solution was heated to 95° C., oxygen gas was started to be blown in at a rate of 950 ml/min using a glass tube from the bottom of the beaker, the reaction was induced for 7 hours under vigorous mixing at atmospheric pressure to make a gas and liquid mixture, and scorodite was produced.

The properties of the produced scorodite crystals are shown in Table 11.

TABLE 11

| As precipitation ratio* (%) | Water content (%) | Scorodite Composition (%) | | Elution value (mg/l) | | | | |
|---|---|---|---|---|---|---|---|---|
| | | As | Fe | As | Pb | Cd | Hg | Se |
| 97.3 | 7.0 | 31.2 | 25.2 | <0.01 | <0.01 | <0.01 | <0.005 | <0.1 |

As precipitation ratio*: rate of conversion of as in solution to scorodite
Elution value: conformance to Environmental Agency Notice 13

Second Embodiment

According to the research of the present inventors, the above oxidation method using hydrogen peroxide ($H_2O_2$) achieves approximately 100% oxidation of trivalent arsenic by accelerating the trivalent arsenic oxidation speed and causing the reaction at a high solution temperature. However, hydrogen peroxide is an expensive agent.

On the other hand, the oxidation method using ozone ($O_3$) achieves approximately 100% oxidation of trivalent arsenic in a short period of time, irrespective of solution temperature. However, this oxidation method has the following problems.

Ozone generating equipment itself requires high costs. Furthermore, ozone has strong oxidizing power, so that the specification of peripheral apparatuses needs to be upgraded. This results in extremely high costs for the system as a whole.

Because ozone is hazardous to humans, an ancillary facility for collecting and detoxifying ozone that is released to the atmosphere without reaction is necessary.

Ozone is easy to dissolve in water than oxygen gas, and the solution after reaction has a peculiar pungent odor. To resolve this problem, a process of removing dissolved ozone in a subsequent step is necessary.

Meanwhile, it became clear that the method of adding powdery metallic copper or the like as a catalyst has the following problems.

1) In the case where the solution to be treated has a low arsenic concentration (for example, approximately 3 g/L), the oxidation rate of arsenic is approximately 100%. However, in the case where the solution to be treated has a high arsenic concentration (for example, 60 to 70 g/L), the oxidation rate of arsenic drops to approximately 79%.

2) When metallic copper($Cu^o$) changes to copper ions ($Cu^{2+}$), the change of trivalent arsenic to pentavalent arsenic is affected. In addition, at the time of this change, at least the number of moles of metallic copper equivalent to trivalent arsenic is required. Furthermore, the same effects as metallic copper are confirmed even in a poor water soluble copper compound ($Cu_2O$, $CuS$). As a result, a large amount of agent (copper source) is necessary when processing arsenous acid being a trivalent arsenic compound.

3) As explained in the above 2), this method uses a large amount of copper source when processing arsenous acid (trivalent arsenic). As a result, copper ions as many as several tens of g/L remains in the solution after the reaction. Therefore, a process of recovering copper from the solution after the reaction is necessary, which causes an increase in copper recovery costs.

4) This reaction is conducted in the acidic solution (for example, the pH is 0 and the FA (free acid) value is 130 g/L), so that a large amount of acid content remains in the solution after the reaction. In order to produce a pentavalent arsenic compound based on the solution after the reaction, a large amount of alkali is necessary. This is an inevitable problem as this method requires dissolving powdery metallic copper and/or a poor water-soluble copper compound, that is, acid content is essential for this method.

Hereinafter, with regard to a second embodiment for implementing the present invention, the 1. Processing object; 2. Oxidation reaction of trivalent arsenic; 3. pH of trivalent arsenic at the beginning of the oxidation reaction; 4. pH of trivalent arsenic at the stop of the oxidation reaction; and Examples 2 to 6 and Comparative Examples 1 to 5 will be described in order in detail while referring to the flowchart shown in FIG. 2, and further the 5. Trivalent arsenic oxidation reaction model conceived by the present inventors will be described.

According to this embodiment, by using materials that can be easily obtained in non-ferrous smelters, trivalent arsenic can be oxidized to pentavalent arsenic at an oxidation rate of 99% or more with low operation costs and low equipment costs.

1. Processing Object

This embodiment is an optimum processing method for producing a highly concentrated arsenic solution.

In other words, according to this embodiment, trivalent arsenic of low solubility can be easily oxidized to pentavalent arsenic of high solubility. Therefore, by using diarsenic trioxide <1> which is solid as the trivalent arsenic source, the diarsenic trioxide dissolves simultaneously with the oxidation of trivalent arsenic to pentavalent arsenic, which ensures the timely supply of trivalent arsenic. As a result, a pentavalent arsenic solution of a concentration as high as several tens of g/L, that is, a concentrated arsenic acid solution can be easily produced.

2. Oxidation Reaction of Trivalent Arsenic

In order to derive this embodiment relating to the oxidation step <4>, the present inventors investigated the step of oxidizing trivalent arsenic by oxygen gas, using copper as an oxidation catalyst for arsenic.

Several points that are subject to the investigation are given below.

1) Using only copper ions as an oxidation catalyst (corresponding to Comparative Examples 1 and 2 described later).

2) Using only copper sulfide as an oxidation catalyst (corresponding to Comparative Example 3 described later).

3) Using the two types of oxidation catalysts of copper sulfide and copper ions together (corresponding to Comparative Example 4 described later).

4) Using the three types of oxidation catalysts of copper sulfide, copper ions, and a copper pentavalent arsenic compound together (corresponding to Examples 2 to 6 described later).

As a result of the above investigation, the oxidation catalyst effects of copper were observed in all of 1) to 4). However, 4) was found to have dramatic improvements in the oxidation catalyst effects of copper when compared with 1) to 3), in terms of oxidation speed and oxidation rate.

Based on this discovery, it was determined that copper sulfide, copper ions, and a copper pentavalent arsenic compound (copper arsenate) are used together as oxidation catalysts.

Hereinafter, (a) copper sulfide source, (b) copper ion source, (c) copper pentavalent arsenic compound (copper arsenate), (d) reaction temperature, and (e) blowing gas type and blowing amount will be described in detail.

(a) Copper Sulfide Source

Copper sulfide solid, copper sulfide powder, and the like can be used as the copper sulfide source <2>. Furthermore, the powdery state is preferable from the perspective of ensuring reactivity. In addition, copper sulfide can be mainly classified into the two compositions of CuS and $Cu_2S$ (there is also $Cu_9S_5$ being a composition in which a portion of copper in crystal lattice is defective). In this embodiment, any of them is effective, and a mixture of them is also possible. Moreover, the copper sulfide source is preferably as pure copper sulfide as possible (copper sulfide of high purity with minimum impurities). This is because contamination with $As_2S_3$, ZnS, PbS, CdS, and the like can be avoided by using copper sulfide of high purity.

If contaminated with $As_2S_3$, ZnS, PbS, CdS, and the like occurs, the following reactions occur. As a result, the supply of copper ions necessary for the oxidation reaction of trivalent arsenic is hindered (Equation 18 to 21).

Furthermore, regarding $As_2S_3$, that is, arsenic sulfide, even when copper ions are added consciously, the following reaction occurs, which not only makes the maintenance of an optimum copper ion concentration difficult, but also causes hydrogen ion ($H^+$) evolution reaction. When hydrogen ions ($H^{3O}$) are generated, the pH of the reaction system drops. This makes it difficult to maintain the oxidation reaction of trivalent arsenic according to the present invention, and makes it difficult to oxidize trivalent arsenic.

$Cu^{2+}+\frac{1}{3}As_2S_3+\frac{4}{3}H_2O=CuS+\frac{2}{3}HAsO_2+2H^+$ (Equation 18)

$Cu^{2+}+ZnS=CuS+Zn^{2+}$ (Equation 19)

$Cu^{2+}+PbS=CuS+Pb^{2+}$ (Equation 20)

$Cu^{2+}+CdS=CuS+Cd^{2+}$ (Equation 21)

Consider the case where copper sulfide recovered as smelting intermediates is used as the copper sulfide source <2>. The recovered copper sulfide contains substantial amounts of the aforementioned $As_2S_3$, ZnS, PbS, CdS, and the like. Therefore, it is not preferable to use the copper sulfide recovered as smelting intermediates directly as the copper sulfide source <2>. However, the recovered copper sulfide can be used if the aforementioned sulfides are removed beforehand by decomposition reaction or the like to thereby increase the purity as copper sulfide.

In copper smelters, copper sulfide of high purity suitable for the present invention can be easily produced according to the following method.

(1) Electrolytic copper is dissolved (Cu=10 to 30 g/L) by aeration while heating under sulfite acidic conditions (FA (free acid)=50 to 300 g/L), to obtain a copper solution.

(2) The obtained copper solution is reacted with a sulfidizing agent such as NaSH or $H_2S$ at a temperature of 50° C. or more, to recover copper sulfide.

(3) The recovered copper sulfide is washed with water to remove adhered acid content.

The copper sulfide after the water cleaning has little impurities, and is suitable for the present invention in any of the dry condition and the wet condition.

(b) Copper Ion Source

A substance that becomes copper ions in the solution to be treated can be used as the copper ion source <3>.

For example, copper sulfide is preferable, as it is solid at ordinary temperatures, but dissolves into water and immediately becomes copper ions. Though metallic copper or metallic copper powder can also be used, it is necessary to wait for the dissolution until they are ionized.

(c) Copper Pentavalent Arsenic Compound (Copper Arsenate)

Copper arsenate is available as the copper pentavalent arsenic compound according to the present invention. Copper arsenate has a solubility product comparable to iron arsenate ($FeAsO_4$), and is a pentavalent arsenic compound that is easily formed in the weakly acidic to neutral region.

In this embodiment, copper sulfide is added to the solution containing trivalent arsenic with the initial pH value being set to 2 or more, and the oxidation reaction is started. Thus, the oxidation of the trivalent arsenic to pentavalent arsenic and the supply of copper ions by the dissolution of the copper sulfide occur simultaneously on the surface of the added copper sulfide, and therefore the generation of copper arsenate is though to occur instantaneously. When the reaction is complete, the solution is naturally transferred to the weakly acidic region. By this time, however, the pentavalent arsenic and the copper ions are both concentrated to the order of g/L. Due to this concentration, the generative capacity of the copper arsenate will not decrease.

At this point, unless the pH of the solution sinks below 1 into the acidic state, the forming capacity of the copper arsenate will not decrease significantly. Accordingly, it is preferable to control the pH.

(d) Reaction Temperature

The oxidation of arsenic is preferably performed at a higher solution temperature. Specifically, a temperature of 50° C. or more is required for the progress of the oxidation of arsenic. The solution is heated <5> to 70 to 90° C. and preferably about 80° C., in consideration of real operation and based on the premise such as the material of the reaction tank and the filtering operation after the reaction.

(e) Blowing Gas Type and Blowing Amount

The oxidation reaction of trivalent arsenic is possible even when the blowing gas <6> is air. However, when oxygen gas or a gas mixture of air and oxygen gas is used as the blowing gas <6>, the oxidation speed is maintained even in the range where the arsenic concentration in the solution is low, and the blowing (gas) capacity decreases. As a result, heat loss associated with this is reduced, and the maintenance of the reaction temperature becomes easier. Therefore, it is preferable to use oxygen gas or a gas mixture of oxygen gas and air as the blowing gas <6>, in terms of the oxidation speed and the reaction temperature maintenance.

Regarding the blowing amount per unit time of the blowing gas <6>, its optimum value changes depending on the gas-liquid mixing state in the reaction tank. For example, by using a microscopic bubble generation apparatus and the like, the oxidation efficiency can be further improved, and the blowing amount can be reduced.

Therefore, at the time of real operation, it is important to find the optimum value in consideration of the gas-liquid mixing state, the oxygen gas blowing method, and the like.

3. pH of Trivalent Arsenic at the Beginning of the Oxidation Reaction

A basic equation of the oxidation reaction of trivalent arsenic according to the present invention is thought to be the following.

$$As_2O_3 + H_2O = 2HAsO_2 \tag{Equation 22}$$

Reaction in which diarsenic trioxide dissolves in water as arsenous acid (trivalent arsenic).

$$2HAsO_2 + O_2 + 2H_2O = 2H_2AsO_4 + 2H^+ \tag{Equation 23}$$

Reaction in which arsenous acid (trivalent arsenic) oxides.

$$2HAsO_2 + O_2 + 2H_2O = 2H_3AsO_4 \tag{Equation 24}$$

Reaction in which arsenous acid (trivalent arsenic) oxides.

As in the Examples described later, in the case of the concentrated solution whose arsenous acid concentration at the time of complete arsenic dissolution is 40 g/L or more, the solubility of arsenous acid is small, and therefore diarsenic trioxide does not dissolve totally in the initial stage.

In the case of the concentrated arsenic solution, simultaneously with the oxidation of arsenous acid to arsenate of high solubility according to (Equation 23) and (Equation 24) and the decrease of the arsenous acid concentration, the reaction in which arsenous acid is added into the system is thought to proceed. In other words, the solid diarsenic trioxide is thought to dissolve while being suspended in the initial stage of the reaction (Equation 22).

At this point, the oxidation of arsenous acid to arsenate is thought to be in accordance with (Equation 23) and (Equation 24).

In the oxidation reaction of arsenous acid to arsenate, the behavior in which the pH of the solution rapidly decreases to about 2 is shown in initial 30 minutes. From this behavior, it can be estimated that the oxidation mainly proceeds according to (Equation 23) in the neutral region where the pH is 2 or more. Meanwhile, the decrease of the pH becomes gradual in the subsequent 30 minutes, and so it can be estimated that the reaction mainly proceeds according to (Equation 24).

In view of the above, it can be understood that the efficient oxidation of trivalent arsenic and the control of the pH at the stop of the reaction to the weakly acidic state according to the present invention can be achieved by setting the pH at the beginning of the oxidation reaction (when the air and/or oxygen gas blowing starts) to 2 or more.

4. pH of Trivalent Arsenate at the Stop of the Oxidation Reaction

In this embodiment according to the present invention, the pH of trivalent arsenate at the stop of the oxidation reaction (when the air and/or oxygen gas blowing stops) was below 2 and more specifically about 1.8 in all cases, as shown by the results of Examples 2 to 6 described later.

This pH of about 1.8 is a preferable pH for producing a pentavalent arsenic compound (the acid concentration is at an adequate level). This is because the optimum pH range for producing iron arsenate which is a pentavalent arsenic compound is pH=3.5 to 4.5, and so the neutralizing agent consumed for neutralizing acid content can be reduced.

On the other hand, in the production of scorodite ($FeAsO_4 \cdot 2H_2O$), the pentavalent arsenic solution whose pH is about 1 is used as the stock solution, and therefore the pH can be adjusted by adding a small amount of inverse neutralizing agent (for example, sulfuric acid). Furthermore, the pH at the stop of the reaction is preferably not less than 1 and below 2, though the details will be described in Example 6 below.

The pH at the stop of the trivalent arsenic oxidation reaction (when the air and/or oxygen blowing stops) being below 2 and specifically about 1.8 is thought to be derived from the above (Equation 22) to (Equation 24).

First, according to (Equation 22), diarsenic trioxide is dissolved in water as arsenous acid (trivalent arsenic). Furthermore, this is not limited to the case where the starting row material is the solid diarsenic trioxide, but also applies to the case of the aqueous solution in which arsenic trioxide has already been dissolved as arsenous acid (therefore, the present invention is thought to be applicable to ordinary drainage treatment).

The product obtained in the above oxidation step <4> is separated in the filtering <7> into the filtrate <8> and the filter and <9>. In the filtering <7>, an ordinary filtering method such as filter press can be applied. This is because, though a copper pentavalent arsenic compound is generated in the above oxidation step <4>, there is no problem of filterability such as increased viscosity.

The obtained filtrate <7> is an arsenate solution having a pH of about 1.8 as mentioned above. Since the pH of about 1.8 is preferable for producing pentavalent arsenic compounds, a pentavalen arsenic compound can be produced from the filtrate <7> with low costs and high productivity.

On the other hand, the filter and <9> is a mixture of copper sulfide and a copper pendavalent arsenic compound, and accordingly can be repeatedly used as it is as an oxidation catalyst. When repeatedly using this, the catalyst effect can be expected to increase by newly adding copper sulfide of an amount equivalent to partially dissolved copper sulfide.

5. Trivalent Arsenic Oxidation Reaction Mechanism Model

The ternary catalyst made up of copper sulfide, copper ions, and a copper pentavalent arsenic compound according to the present invention has both a high oxidation rate and a high oxidation speed. The oxidation catalyst effects exhibited by this ternary catalyst is thought to be derived from the battery-like reaction caused by the contact of each type of ionson the copper sulfide surface.

For example, consider the model of the oxidation reaction mechanism using the region of about pH=2 as an example.

First, substituting the trivalent arsenic oxidation to electrode reactions yields (Equation 25) showing the anodic reaction and (Equation 26) showing the cathodic reaction.

$$As_2O_3 + 5H_2O = 2H_3OAsO_4 + 4H^+ + 4e^- \tag{Equation 25}$$

$$4H^+ + O_2 + 4e^- = 2H_2O \tag{Equation 26}$$

In other words, the oxidation reaction of trivalent arsenic proceeds as shown in (Equation 25), but it is necessary to maintain electrical neutralization in order to have the reaction proceed. Therefore, the reactivity depends on the progress of the cathodic reaction shown in (Equation 26) which proceeds on the copper sulfide surface. Due to this, it is thought to be important to secure the copper sulfide surface which always has a high activation level.

Which is to say, in the present reaction model system, copper ions coexist and also the reaction occurs in the weakly acidic pH region, and therefore the crystallizing reaction of the copper sulfide compound as shown in (Equation 27) is thought to occur on the copper sulfide surface.

$$Cu^{2+} + H_3AsO_4 + H_2O = CuHAsO_4 \cdot H_2O + 2H^+ \tag{Equation 27}$$

According to (Equation 27), it can be considered that hydrogen ions (H⁺) are added to the copper sulfide surface and the reactions shown in (Equation 28) and (Equation 29) proceed simultaneously.

$$CuS + 2H^+ + \tfrac{1}{2}O_2 = Cu^{2+} + S^\circ + H_2O \quad \text{(Equation 28)}$$

$$CuS + H^+ + 2O_2 = Cu^{2+} + HSO_4^- \quad \text{(Equation 29)}$$

At this time, the copper arsenate compound is formed on the copper sulfide surface, so that the oxygen gas supply becomes insufficient and the S° (monatomic sulfur) generating reaction as shown in (Equation 28) is likely to proceed. Further, with the progress of (Equation 28) and (Equation 29), it is estimated that the Cu ion concentration increases locally and also the hydrogen ion (H⁺) concentration decreases. At this location, the copper sulfide generating reaction shown in (Equation 30) is thought to proceed simultaneously with the above (Equation 28) and (Equation 29).

$$Cu^{2+} + \tfrac{4}{3}S^\circ + \tfrac{1}{3}H_2O = CuS + \tfrac{1}{3}HSO_4^- + \tfrac{7}{3}H^+ \quad \text{(Equation 30)}$$

(Equation 30) shows the crystallization of CuS which is copper sulfide, and indicates that the CuS crystallization is ensured on the copper sulfide surface as the newly-formed surface of high activity.

Furthermore, the hydrogen ions (H⁺) generated in (Equation 30) are supplied to the reactions shown in (Equation 28) and (Equation 29), and also consumed in the dissolution reaction of the copper arsenate compound (the inverse reaction of (Equation 27)). As a result, the addition of copper ions to the copper sulfide surface and the dispersion of arsenic acid ($H_3AsO_4$) to the periphery are thought to proceed.

Note, in the condition of pH=0 shown in Comparative Example 5 below, basically the reaction shown in (Equation 27) does not proceed and the reaction shown in (Equation 30) does not proceed easily, and so it is interpreted that the oxidation efficiency drops significantly.

EXAMPLES

Example 2

Diarsenic trioxide of reagent grade (the grade is shown in Table 12) and copper sulfide of reagent grade (the grade is shown in Table 13) were prepared.

As described above, copper sulfide can be mainly classified into the two forms of CuS and $Cu_2S$, and there is also a composition $Cu_9S_5$ in which a portion of copper in crystal lattice is defective. Any of these forms is usable, and a mixture of these forms is applicable too.

The results of X-ray diffraction of copper sulfide used in this Example are shown in FIG. 3. Note, in FIG. 3, the peak of CuS is plotted as Δ, the peak of $Cu_2S$ is plotted as *, and the peak of $Cu_9S_5$ is plotted as ♦. From the results of X-ray diffraction, the copper sulfide used in this Example is thought to be the mixture of CuS, $Cu_2S$, and $Cu_9S_5$.

TABLE 12

| arsenic (%) | sulfur (ppm) | copper (ppm) | zinc (ppm) | lead (ppm) | cadmium (ppm) |
|---|---|---|---|---|---|
| 74.8 | 1,303 | 27 | 11 | 60 | 2 |

TABLE 13

| copper (%) | sulfur (%) | zinc (ppm) | lead (ppm) | cadmium (ppm) |
|---|---|---|---|---|
| 71.2 | 26.1 | 29 | 2 | 1 |

A 1 L beaker was used as the reaction vessel, a 2-stage turbine blade and 4 baffle plates of 700 rpm were used as the mixture device, and the gas blowing was conducted by blowing in oxygen gas using a glass tube from the bottom of the beaker (the oxidation was performed in a gas and liquid mixture in vigorous mixing).

50 g of diarsenic trioxide and 48 g of copper sulfide were introduced in the reaction vessel, 800 cc of pure water was added to repulp, and the solution was heated to 80° C. Next, the mixture of the solution was started using the mixture device, and further the blowing of oxygen gas from the bottom of the reaction vessel was started at 400 cc/min, to oxidize trivalent arsenic. Note, the pH of the solution immediately before the oxygen gas blowing start was 3.09 (at 80° C.).

The solution mixture and the oxygen gas blowing were continued for 90 minutes to oxidize the trivalent arsenic. The temperature, pH, redox potential, copper ion amount, trivalent arsenic amount, and pentavalent arsenic amount of the solution were measured every 30 minutes. The measurement results are shown in Table 14. Note, the redox potential is Ag/AgCl reference electrode value.

TABLE 14

| Elapsed time (minutes) | 30 | 60 | 90 |
|---|---|---|---|
| Temperature (° C.) | 79 | 79 | 79 |
| pH | 2.13 | 1.88 | 1.84 |
| Redox potential (mV) | 298 | 327 | 383 |
| $Cu^{2+}$ (g/L) | 1.8 | 4.0 | 5.6 |
| Trivalent arsenic (g/L) | 29.2 | 8.3 | 0.2 |
| Pentavalent arsenic (g/L) | 13.9 | 33.2 | 40.7 |
| Oxidation rate (%) | 32.3 | 80.0 | 99.5 |

After the oxidation of the trivalent arsenic was continued for 90 minutes, the solution was filtered, the catalyst recovered as the residue was washed with water, and the grade analysis and X-ray diffraction of the catalyst were performed. The grade analysis results and X-ray diffraction results of the catalyst after the reaction are shown in Table 15 and FIG. 4, respectively. In FIG. 4, the peak of CuS is plotted by Δ, and the peak of the copper pentavalent arsenic compound is plotted by ○.

TABLE 15

| copper (%) | sulfur (%) | arsenic (%) |
|---|---|---|
| 54.2 | 22.6 | 10.5 |

From Table 14, Table 15, and FIG. 4, it can be understood that copper sulfide, copper ions, and a copper pentavalent arsenic compound (copper arsenate) coexist in the reaction system according to Example 2.

Moreover, it can be understood that the oxidation speed and the oxidation rate of the trivalent arsenic are high in Example 2. In particular, it was confirmed that the oxidation rate of 99% or more was already reached at the point of 90 minutes after the oxidation reaction start.

Example 3

The same operations and measurements as in Example 2 were performed except that the amount of copper sulfide introduced in the reaction vessel was 24 g which is one half.

Note, the pH of the solution immediately before the oxygen gas blowing start was 2.96 (at 80° C.).

The results of measuring the temperature, pH, redox potential, copper ion amount, trivalent arsenic amount, and pentavalent arsenic amount of the solution every 30 minutes are shown in Table 16, and the analysis results of the grade of the catalyst recovered as the residue and washed with water are shown in Table 17.

TABLE 16

| Elapsed time (minutes) | 30 | 60 | 90 | 120 |
|---|---|---|---|---|
| Temperature (° C.) | 79 | 80 | 80 | 80 |
| pH | 2.17 | 1.88 | 1.80 | 1.79 |
| Redox potential (mV) | 301 | 317 | 336 | 384 |
| $Cu^{2+}$ (g/L) | 1.1 | 2.1 | 3.1 | 4.5 |
| Trivalent arsenic (g/L) | 32.6 | 21.3 | 7.4 | 0.3 |
| Pentavalent arsenic (g/L) | 11.4 | 24.1 | 38.0 | 45.6 |
| Oxidation rate (%) | 25.9 | 53.1 | 83.7 | 99.4 |

TABLE 17

| copper (%) | sulfur (%) | arsenic (%) |
|---|---|---|
| 63.4 | 29.4 | 2.3 |

In Example 3, the CuS additive amount is reduced by half of Example 2, to examine the effects of this reduction by half.

As a result, the oxidation speed of trivalent arsenic decreased a little when compared with Example 2, but the oxidation capacity was sufficiently maintained, and the oxidation of 99% or more was observed at the point of 120 minutes after the oxidation reaction start. As with Example 2, the oxidation capacity and speed of trivalent arsenic can both be considered favorable for practical use.

Example 4

This Example is similar to Example 2, but further, 16 g of copper sulfide of reagent grade ($CuSO_4 \cdot 5H_2O$) was introduced into the reaction vessel. The amount of copper sulfide introduced is equivalent to 5 g/L as copper ions. This Example relates to the case of increasing the copper ion concentration than in the initial stage of the reaction.

Note, the pH of the solution immediately before the oxygen gas blowing start was 2.98 (at 80° C.).

The results of measuring the temperature, pH, redox potential, copper ion amount, trivalent arsenic amount, and pentavalent arsenic amount of the solution every 30 minutes are shown in Table 18.

In this Example, the oxygen gas blowing was stopped at 120 minutes when the reaction ended. After this, a NaOH solution of concentration 500 g/L was added to neutralize the solution to pH=3.5, copper ions existing in the solution were crystallized as a pentavalent arsenic compound, and then the filtering operation was performed. Note, the additive amount of the NaOH solution was 40 cc.

The total arsenic concentration in the filtrate obtained as a result of the filtering operation was 29.6 g/L, while the copper concentration was 80 mg/L. Thus, the concentration decrease associated with the formation of the copper arsenate compound was observed.

On the other hand, the residue recovered as a result of the filtering operation was 165 g·wet. Extracting 5 g·wet of this residue and measuring the moisture content produced the results that the moisture content=59.9%. In addition, 5 g·wet of the residue was washed with water and the grade was analyzed. The analysis results of the grade of the recovered residue are shown in Table 19.

TABLE 18

| Elapsed time (minutes) | 30 | 60 | 90 | 120 |
|---|---|---|---|---|
| Temperature (° C.) | 79 | 79 | 80 | 80 |
| pH | 1.84 | 1.86 | 1.90 | 1.79 |
| Redox potential (mV) | 299 | 321 | 356 | 386 |
| $Cu^{2+}$ (g/L) | 6.1 | 8.0 | 10.1 | 10.9 |
| Trivalent arsenic (g/L) | 34.7 | 17.0 | 0.7 | 0.2 |
| Pentavalent arsenic (g/L) | 7.9 | 27.9 | 42.8 | 41.0 |
| Oxidation rate (%) | 18.5 | 62.2 | 98.5 | 99.5 |

TABLE 19

| copper (%) | sulfur (%) | arsenic (%) |
|---|---|---|
| 47.5 | 12.1 | 19.7 |

Example 4 increases the Cu ion concentration than in the initial stage of the reaction in Example 2. From the results of Table 18, it can be understood that the reaction was complete at a high oxidation rate in Example 4, too.

On the other hand, in Example 4, the oxidation speed decreased a little when compared with Example 2. This indicates that the copper ion concentration in the reaction system need not increased more than necessary. It can be judged that the sufficient copper ion concentration in the reaction system is approximately 1 to 5 g/L.

Furthermore, when using copper sulfide immediately after being produced by the wet sulfidation reaction, this copper sulfide has a behavior of poor solubility. In view of this, when using copper sulfide immediately after being produced by the wet sulfidation reaction, the addition of copper ions to the reaction system is effective.

Moreover, Example 7 recovers added copper ions as a copper pentavalent arsenic compound by neutralization. The method of recovering copper ions is not limited to the method of recovering as a copper pentavalent arsenic compound, and may instead be a method of adding an agent that reacts with copper ions and forms copper sulfide, such as monatomic sulfur or ZnS.

Example 5

50 g of diarsenic trioxide of reagent grade was prepared.

The whole residue recovered in Example 4 (except 10 g·wet used for the measurement sample in Example 4) and 50 g of diarsenic trioxide were introduced into the reaction vessel, and 707 cc of pure water was added to repulp, to bring the moisture content in the pulp to be 800 cc. This pulp was heated to 80° C., and then oxygen gas was started to be blown in from the bottom of the reaction vessel at 400 cc/min.

Note, the pH of the solution immediately before the oxygen gas blowing start was 3.03 (at 79° C.).

The results of measuring the temperature, pH, redox potential, copper ion amount, trivalent arsenic amount, and pentavalent arsenic amount of the solution every 30 minutes are shown in Table 20.

TABLE 20

| Elapsed time (minutes) | 30 | 60 | 90 |
|---|---|---|---|
| Temperature (° C.) | 80 | 80 | 79 |
| pH | 2.20 | 1.90 | 1.83 |
| Redox potential (mV) | 294 | 349 | 382 |
| $Cu^{2+}$ (g/L) | 2.2 | 3.2 | 4.7 |
| Trivalent arsenic (g/L) | 24.2 | 2.4 | 0.2 |
| Pentavalent arsenic (g/L) | 24.4 | 48.5 | 52.3 |
| Oxidation rate (%) | 50.2 | 95.3 | 99.6 |

After the reaction for 90 minutes, the oxygen gas blowing was stopped, a NaOH solution of concentration 500 g/L was added to neutralize the solution to pH=3.0, and then the solution was filtered. Note, the amount of the NaOH solution used was 36 cc.

The total arsenic concentration in the filtrate obtained was 44.8 g/L, while the Cu concentration was 210 mg/L. Thus, the recovery of the arsenic concentration approximately equivalent to the composition concentration was observed.

On the other hand, the residue recovered was 122 g·wet. Extracting 5 g·wet of this residue and measuring the moisture content produced the results that the moisture content=48.9%. In addition, 5 g·wet of the residue was washed with water and the grade was analyzed.

The analysis results of the grade of the catalyst recovered as the residue are shown in Table 21.

TABLE 21

| copper (%) | sulfur (%) | arsenic (%) |
|---|---|---|
| 44.4 | 10.6 | 21.8 |

This Example 5 exhibited highest oxidation efficiency and a highest oxidation speed, in Examples 2 to 6. Specifically, the oxidation of 95% was already observed at the point of 60 minutes from the reaction, and the oxidation rate of 99.6% which is approximately 100% was observed at the point of 90 minutes from the reaction.

The catalyst according to this Example 5 is the ternate catalyst of copper sulfide, copper ions, and a copper arsenate compound (copper pentavalent arsenic compound), too. The catalyst according to this Example 5 especially has a high content ratio of the copper arsenate compound (copper pentavalent arsenic compound) compare to Example 2 and Example 3. This high content ratio of the copper arsenate compound is thought to contribute to the improved oxidation performance. In other words, as described in "Model of oxidation reaction" this contribution phenomenon demonstrates that the formation and presence of the copper arsenate compound relates to the generation of the newly-formed surface of CuS of high activity.

Example 6

The same operations as in Example 3 were performed except that the pH immediately before the oxygen gas blowing start was adjusted to 1.0 (at 80° C.) by adding concentrated sulfuric acid to the pulp.

The results of measuring the temperature, pH, redox potential, copper ion amount, trivalent arsenic amount, and pentavalent arsenic amount of the solution every 30 minutes are shown in Table 22. Moreover, the catalyst grade after the reaction (washed with water) are shown in Table 23.

TABLE 22

| Elapsed time (minutes) | 30 | 60 | 90 | 120 |
|---|---|---|---|---|
| Temperature (° C.) | 81 | 79 | 80 | 79 |
| pH | 1.22 | 1.15 | 1.15 | 1.13 |
| Redox potential (mV) | 363 | 371 | 375 | 380 |
| $Cu^{2+}$ (g/L) | 4.8 | 5.2 | 5.7 | 6.3 |
| Trivalent arsenic (g/L) | 33.6 | 24.4 | 17.6 | 12.8 |
| Pentavalent arsenic (g/L) | 10.9 | 21.2 | 28.2 | 33.4 |
| Oxidation rate (%) | 24.5 | 46.5 | 61.6 | 72.3 |

TABLE 23

| copper (%) | sulfur (%) | arsenic (%) |
|---|---|---|
| 66.0 | 31.1 | 0.6 |

Example 6 is similar to Example 3 in the amount of copper sulfide added, but the pH of the solution immediately before the oxidation start was adjusted to 1.

As a result, the oxidation capacity decreased when compared with Example 3, and the oxidation rate was 72% at the point of 120 minutes. Though the reaction needs to be performed for a long period of time to reach the oxidation rate of 100%, the oxidation capacity itself is sufficient.

The reason of the above oxidation speed decrease can be attributed to the fact that the coexisting copper sulfide was significantly reduced. Furthermore, when the pH of the solution is 1, the amount of dissolution of copper sulfide increases, so that the amount of copper sulfide recovered without dissolving (amount of recycle) decreases, which is disadvantageous in terms of cost, too.

In view of the above, it is thought to be preferable to start the reaction by setting the pH of the solution to not less than 2 and ending the oxidation reaction with a pH of not less than 1, in terms of ensuring the reactivity and the CuS recovery amount.

Comparative Example 1

The same operation as in Example 2 was performed except that 50 g of diarsenic trioxide of reagent grade alone was introduced in the reaction vessel and 800 cc of pure water was added to repulp.

Note, the pH of the solution immediately before the oxygen gas blowing start was 2.80 (at 80° C.).

The temperature, pH, redox potential, copper ion amount, trivalent arsenic amount, and pentavalent arsenic amount of the solution were measured every 30 minutes. The measurement results are shown in Table 24.

TABLE 24

| Elapsed time (minutes) | 30 | 60 | 90 |
|---|---|---|---|
| Temperature (° C.) | 80 | 79 | 80 |
| pH | 2.71 | 2.68 | 2.67 |
| Redox potential (mV) | 378 | 373 | 370 |
| $Cu^{2+}$ (g/L) | <0.1 | <0.1 | <0.1 |
| Trivalent arsenic (g/L) | 42.0 | 44.0 | 45.5 |
| Pentavalent arsenic (g/L) | 0 | 0.1 | 0.4 |
| Oxidation rate (%) | 0 | 0.2 | 0.9 |

In Comparative Example 1, it was observed that the oxidation of trivalent arsenic proceeded little.

Comparative Example 2

The same operation as in Example 2 was performed except that 50 g of diarsenic trioxide of reagent grade and 16 g of copper sulfide of reagent grade (CuSO$_4$.5H$_2$O) were introduced in the reaction vessel and 800 cc of pure water was added to repulp.

Note, the pH of the solution immediately before the oxygen gas blowing start was 3.33 (at 80° C.).

The temperature, pH, redox potential, copper ion amount, trivalent arsenic amount, and pentavalent arsenic amount of the solution were measured every 30 minutes. The measurement results are shown in Table 25.

TABLE 25

| Elapsed time (minutes) | 30 | 60 | 90 |
|---|---|---|---|
| Temperature (° C.) | 81 | 79 | 80 |
| pH | 3.22 | 3.16 | 3.10 |
| Redox potential (mV) | 373 | 378 | 382 |
| Cu$^{2+}$ (g/L) | 5.3 | 5.5 | 5.7 |
| Trivalent arsenic (g/L) | 40.3 | 43.6 | 45.3 |
| Pentavalent arsenic (g/L) | 0.5 | 0.9 | 1.3 |
| Oxidation rate (%) | 1.2 | 2.0 | 2.8 |

In Comparative Example 2, though the progress of oxidation was observed when compared with Comparative Example 1, but the degree of progress was still small.

Comparative Example 3

The same operation as in Example 2 was performed except that 50 g of diarsenic trioxide of reagent grade and 32 g of copper sulfide of reagent grade (CuSO$_4$.5H$_2$O) (10 g/L as copper ions) were introduced in the reaction vessel and 800 cc of pure water was added to repulp. Note, the pH of the solution immediately before the oxygen gas blowing start was 3.45 (at 80° C.).

The temperature, pH, redox potential, copper ion amount, trivalent arsenic amount, and pentavalent arsenic amount of the solution were measured every 30 minutes. The measurement results are shown in Table 26.

TABLE 26

| Elapsed time (minutes) | 30 | 60 | 90 |
|---|---|---|---|
| Temperature (° C.) | 79 | 81 | 79 |
| pH | 3.29 | 3.20 | 3.25 |
| Redox potential (mV) | 369 | 372 | 378 |
| Cu$^{2+}$ (g/L) | 10.7 | 10.6 | 10.8 |
| Trivalent arsenic (g/L) | 39.5 | 42.5 | 43.4 |
| Pentavalent arsenic (g/L) | 2.5 | 3.0 | 3.5 |
| Oxidation rate (%) | 6.0 | 6.6 | 7.4 |

In Comparative Example 3, the progress of oxidation was observed as a result of increasing the Cu ion concentration in the solution. However, the degree of progress of oxidation was still small, and further addition of copper ions is thought to be necessary. Hence Comparative Example 6 is not suitable for practical use.

Comparative Example 4

The same operation as in Example 2 was performed except that 50 g of diarsenic trioxide of reagent grade, 48 g of copper sulfide of reagent grade (CuS), and 20 g of sulfur powder were introduced in the reaction vessel and 800 cc of pure water was added to repulp.

Note, the pH of the solution immediately before the oxygen gas blowing start was 2.67 (at 80° C.).

The temperature, pH, redox potential, copper ion amount, trivalent arsenic amount, and pentavalent arsenic amount of the solution were measured every 30 minutes. The measurement results are shown in Table 27.

TABLE 27

| Elapsed time (minutes) | 30 | 60 | 90 |
|---|---|---|---|
| Temperature (° C.) | 79 | 79 | 81 |
| pH | 1.75 | 1.65 | 1.63 |
| Redox potential (mV) | 340 | 341 | 343 |
| Cu$^{2+}$ (g/L) | <0.1 | <0.1 | <0.1 |
| Trivalent arsenic (g/L) | 35.2 | 35.3 | 35.4 |
| Pentavalent arsenic (g/L) | 10.4 | 10.7 | 10.9 |
| Oxidation rate (%) | 22.8 | 23.3 | 23.5 |

After the end of the reaction, the solution was filtered, the obtained residue was washed with water, and the grade analysis and X-ray diffraction were performed. The catalyst grade after the reaction (washed with water) is shown in Table 28, and the X-ray diffraction results are shown in FIG. 5.

In FIG. 5, the peak of CuS is plotted by Δ, and the peak of sulfur is plotted by ■.

In the grade analysis, 0.1% arsenic was detected, but this can be considered to result from the unwashed solution adhesion.

From FIG. 5 and Table 28, it can be understood that there is no presence of copper ions and a copper pentavalent arsenic compound in this Comparative Example 4 to a single catalyst system of copper sulfide.

TABLE 28

| copper (%) | sulfur (%) | arsenic (%) |
|---|---|---|
| 49.5 | 50.0 | 0.1 |

In this Comparative Example 4, the progress of oxidation was observed. This indicates that single copper sulfide has a higher oxidation capacity as a catalyst than single Cu ions used in Comparative Examples 2 and 3. However, the degree of progress of oxidation is still not appropriate in terms of practical use.

Comparative Example 5

The same operation as in Example 2 was performed except that concentrated sulfuric acid was added to pulp, the pH was adjusted to 0 (at 80° C.), and then the oxygen gas blowing was started.

The temperature, pH, redox potential, copper ion amount, trivalent arsenic amount, and pentavalent arsenic amount of the solution were measured every 30 minutes. The measurement results are shown in Table 29.

TABLE 29

| Elapsed time (minutes) | 30 | 60 | 90 | 120 |
|---|---|---|---|---|
| Temperature (° C.) | 80 | 79 | 80 | 80 |
| pH | 0.00 | 0.00 | −0.02 | −0.04 |
| Redox potential (mV) | 411 | 415 | 412 | 411 |
| Cu$^{2+}$ (g/L) | 9.7 | 10.8 | 11.2 | 11.5 |
| Trivalent arsenic (g/L) | 32.7 | 31.9 | 32.6 | 31.6 |
| Pentavalent arsenic (g/L) | 1.7 | 2.8 | 3.5 | 4.8 |
| Oxidation rate (%) | 4.9 | 8.0 | 9.7 | 13.1 |

After the end of the reaction, the solution was filtered, the obtained residue was washed with water, and the grade analysis and X-ray diffraction were performed. The catalyst grade after the reaction (washed with water) is shown in Table 30, and the X-ray diffraction results are shown in FIG. 6. In FIG. 6, the peak of CuS is plotted by Δ, and the peak of diarsenic trioxide is plotted by □.

TABLE 30

| copper (%) | sulfur (%) | arsenic (%) |
|---|---|---|
| 56.2 | 28.9 | 10.6 |

In Comparative Example 5, the oxidation of arsenic did not progress, and 10.6% arsenic was detected even in the catalyst after the reaction. Moreover, since diarsenic trioxide was acknowledged from the X-ray diffraction results as shown in FIG. 6, it can be understood that the diarsenic trioxide remained without dissolving even after the oxidation reaction.

This is thought to be because the solubility of diarsenic trioxide decreased since the oxidation reaction was started in the sulfuric acidified solution having a pH of 0, and also because trivalent arsenic eluted into the solution remains without being oxidized to pentavalent arsenic of high solubility and therefore the trivalent arsenic concentration in the solution did not decrease and a portion of diarsenic trioxide remains without dissolving.

The results of Comparative Example 5 indicate that, when starting the arsenic oxidation reaction under a condition where the pH is 0 which does not allow formation of copper sulfide, the substances that serve as catalysts are the binary system of copper sulfide and copper ions, which results in a significant drop of the oxidation capacity. This demonstrates that the arsenic oxidation reaction according to the present invention is preferably started under a condition where the pH is not less than 1.

Figure 1:
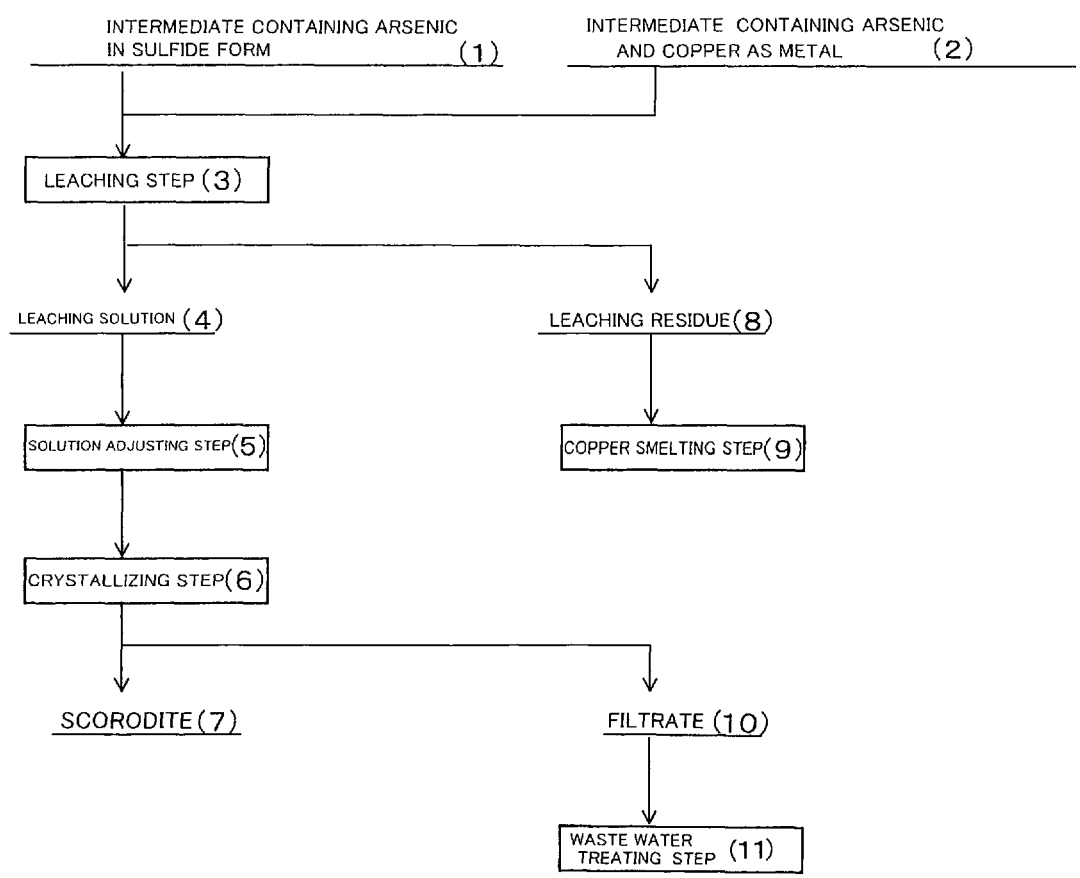
FIG. 1 is a flowchart showing the arsenic processing method of the present invention.
Figure 2:
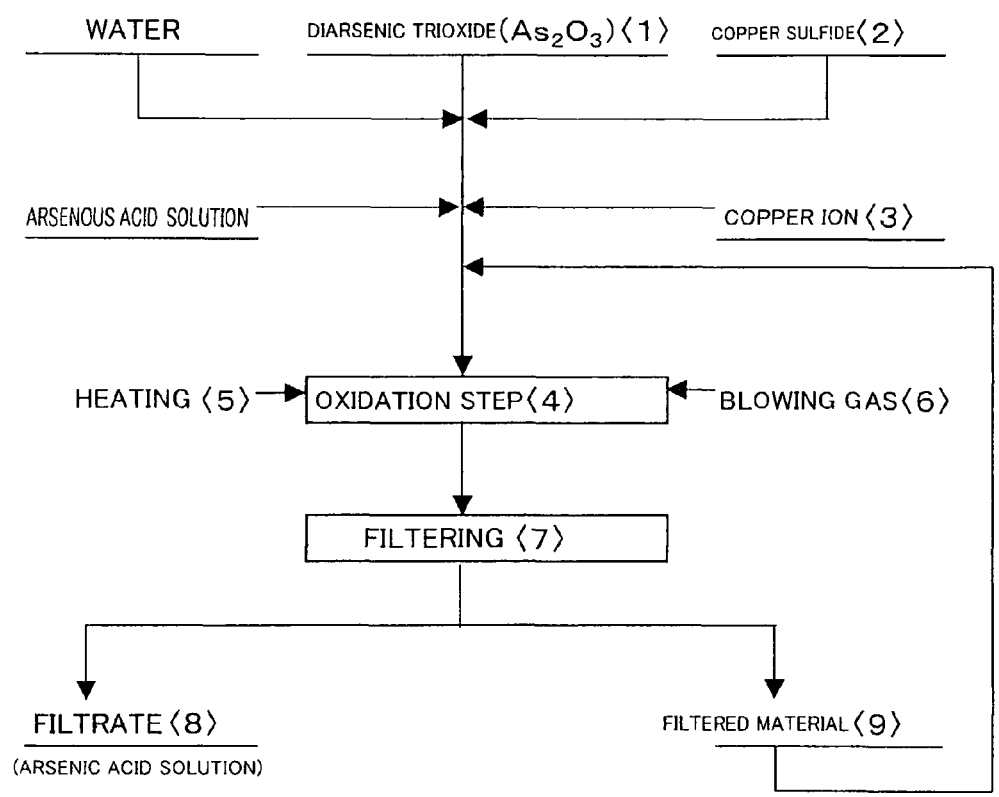
FIG. 2 is a flowchart according to an embodiment (second embodiment) of the present invention.
Figure 3:
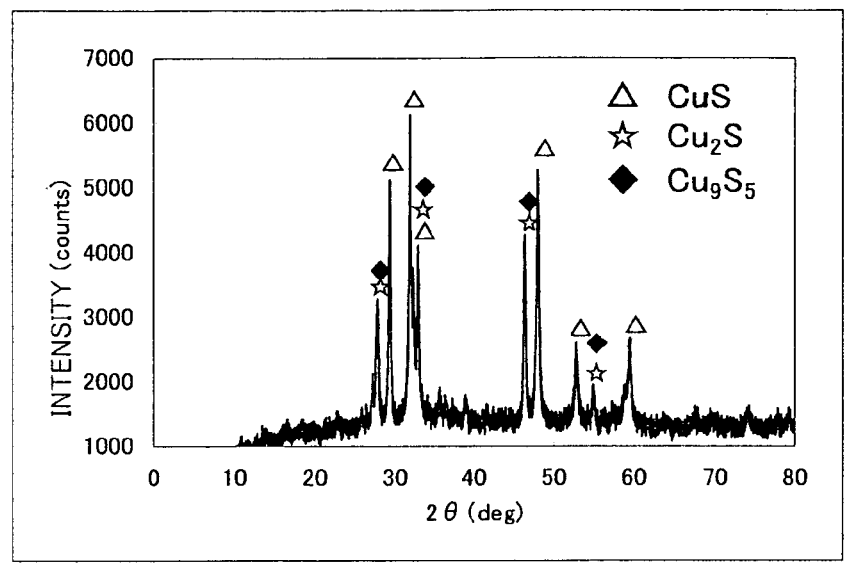
FIG. 3 shows the X-ray diffraction results of copper sulfide in Example 2.
Figure 4:
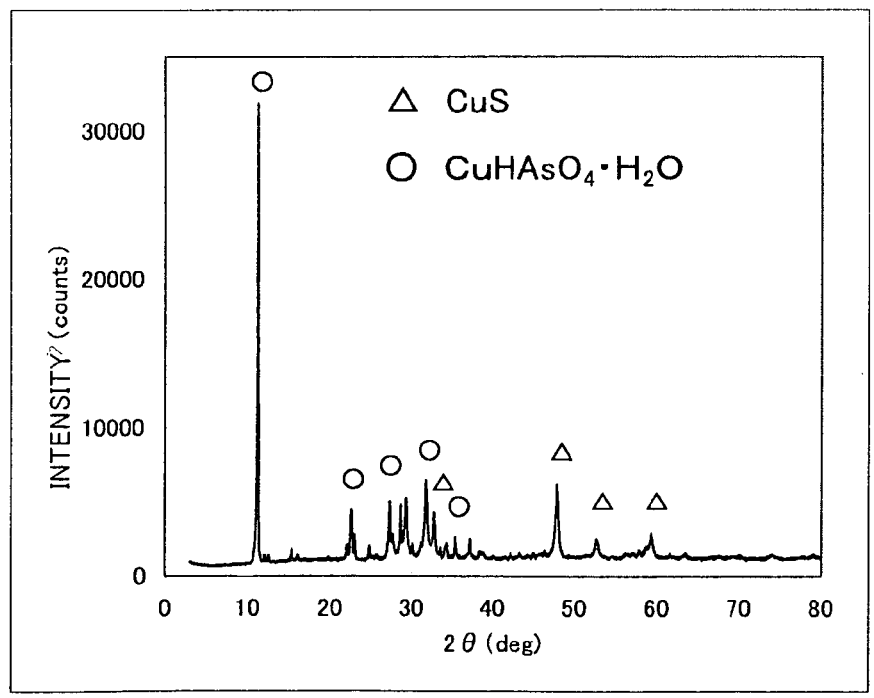
FIG. 4 shows the X-ray diffraction results of the residue in Example 2.
Figure 5:
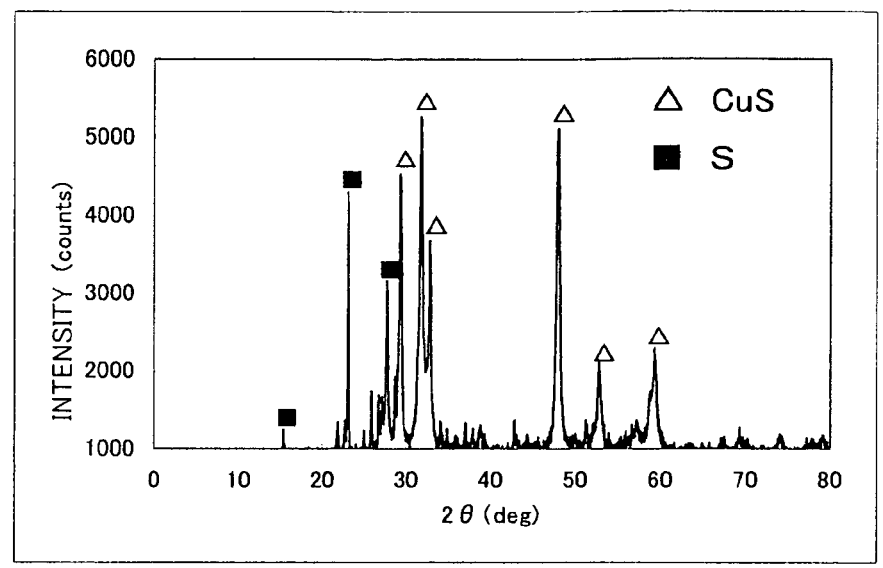
FIG. 5 shows the X-ray diffraction results of the residue in Comparative Example 4.
Figure 6:
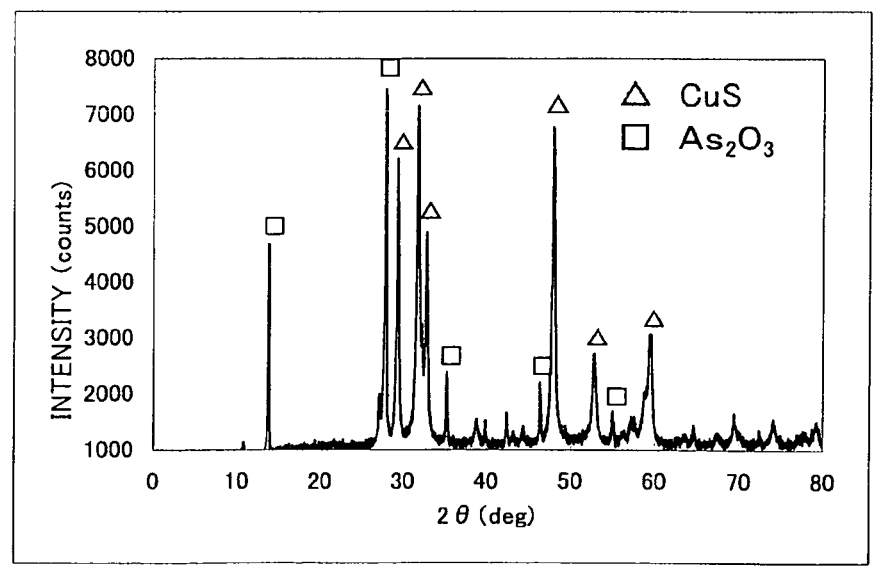
FIG. 6 shows the X-ray diffraction results of the residue in Comparative Example 5.

The invention claimed is:

1. A method of processing non-ferrous smelting intermediates containing arsenic, comprising:
   a leaching step of oxidation leaching of a mixture slurry at an acidic pH to obtain a leaching solution, the mixture slurry being a mixture of a non-ferrous smelting intermediate containing arsenic in sulfide form and a non-ferrous smelting intermediate containing arsenic and copper as metal;
   a solution adjusting step of adding an oxidation agent to the leaching solution to oxidize trivalent arsenic to pentavalent arsenic and obtain an adjusted solution; and
   a crystallizing step of converting arsenic in the adjusted solution to scorodite crystals,
   wherein said leaching step comprises a first leaching step of performing leaching while maintaining a pH of 1.0 to 2.0 at a temperature of 80° C. or lower, while blowing air, oxygen, or a gas mixture of air and oxygen to the mixture slurry of the non-ferrous smelting intermediate containing arsenic in sulfide form and the non-ferrous smelting intermediate containing arsenic and copper as metal.

2. The method according to claim 1, wherein the non-ferrous smelting intermediate containing arsenic and copper as metal is decoppered electrolytic slime.

3. The method according to claim 1, wherein said leaching step further comprises:
   a second leaching step of, following said first leaching step, adding sodium hydroxide to the mixture slurry to bring the pH to not lower than 2.0, and performing leaching for 30 minutes or longer at a temperature of 80° C. or lower while blowing air, oxygen, or a gas mixture of air and oxygen to the mixture slurry, without maintaining the pH; and
   a third leaching step of, following said second leaching step, performing leaching for 30 minutes or longer at a temperature of 80° C. or higher.

4. The method according to claim 3, wherein said leaching step further comprises:
   a fourth leaching step of, following said third leaching step, stopping the blowing of the air, the oxygen, or the gas mixture of air and oxygen and further mixing the mixture slurry for 10 minutes or longer.

5. The method according to claim 1, wherein said solution adjusting step is a step of adding hydrogen peroxide to the leaching solution at a temperature of 40° C. or higher to oxidize the trivalent arsenic to the pentavalent arsenic, and then bringing the leaching solution into contact with metallic copper to remove residual hydrogen peroxide.

6. The method according to claim 1, wherein said crystallizing step is a step of adding and dissolving ferrous salt into the adjusted solution, and causing an oxidation reaction.

7. The method according to claim 6, wherein the oxidation reaction is performed at a pH of 1 or lower.

8. The method according to claim 6, wherein the oxidation reaction is performed at a solution temperature of 50° C. or higher.

9. The method according to claim 6, wherein the oxidation reaction is blowing of air, oxygen, or a gas mixture of air and oxygen.

* * * * *